United States Patent
Lim et al.

(10) Patent No.: US 10,652,726 B2
(45) Date of Patent: May 12, 2020

(54) METHOD AND APPARATUS FOR EFFICIENTLY TRANSMITTING SMALL AMOUNTS OF DATA IN WIRELESS COMMUNICATION SYSTEMS

(71) Applicant: Samsung Electronics Co., Ltd, Suwon-si (KR)

(72) Inventors: Han Na Lim, Seoul (KR); Song Yean Cho, Seoul (KR); Jung Je Son, Yongin-si (KR); Sang Soo Jeong, Suwon-si (KR); Soeng Hun Kim, Yongin-si (KR); Sang Bum Kim, Seoul (KR); Jae Hyuk Jang, Suwon-si (KR); Kyeong In Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/102,566

(22) Filed: Aug. 13, 2018

(65) Prior Publication Data
US 2018/0352418 A1    Dec. 6, 2018

Related U.S. Application Data

(63) Continuation of application No. 14/377,150, filed as application No. PCT/KR2013/000303 on Jan. 15, 2013, now Pat. No. 10,051,458.
(Continued)

(30) Foreign Application Priority Data

Jul. 10, 2012    (KR) .................. 10-2012-0075216

(51) Int. Cl.
*H04M 3/00* (2006.01)
*H04W 8/04* (2009.01)
(Continued)

(52) U.S. Cl.
CPC .............. *H04W 8/04* (2013.01); *H04W 8/08* (2013.01); *H04W 8/22* (2013.01); *H04W 8/18* (2013.01);
(Continued)

(58) Field of Classification Search
CPC .......... H04W 8/04; H04W 8/08; H04W 8/22; H04W 8/18; H04W 36/0055; Y02D 70/14;
(Continued)

(56) References Cited

U.S. PATENT DOCUMENTS

| 6,370,390 B1 | 4/2002 | Salin et al. |
| 8,203,987 B2 | 6/2012 | Ishii et al. |

(Continued)

FOREIGN PATENT DOCUMENTS

| CN | 1229562 A | 9/1999 |
| CN | 101682896 A | 3/2010 |

(Continued)

OTHER PUBLICATIONS

3GPP TS 22.011 V11.2.0 (Dec. 2011), 3rd Generation Partnership Project; Technical Specification Group Services and System Aspects; Service accessibility (Release 11), 26 pages.
(Continued)

*Primary Examiner* — Moustapha Diaby

(57) ABSTRACT

According to one embodiment of the present disclosure, the method by means of which a mobility management entity (MME) determines the communication mode of a terminal in a communication system includes the steps of: receiving, from the terminal, an access request including information on the position of the terminal; transmitting a message to a home subscriber server (HSS) on the basis of the received access request; receiving, from the HSS, specific position information for setting a first mode; comparing the information on the position of the terminal with the specific position information; and determining the communication mode of the terminal according to the result of the comparison. According to the present disclosure, the frequent transmission of small amounts of data can be supported in an efficient manner.

20 Claims, 19 Drawing Sheets

Related U.S. Application Data

(60) Provisional application No. 61/595,646, filed on Feb. 6, 2012.

(51) Int. Cl.
*H04W 8/08* (2009.01)
*H04W 8/22* (2009.01)
*H04W 8/18* (2009.01)
*H04W 36/00* (2009.01)

(52) U.S. Cl.
CPC ......... *H04W 36/0055* (2013.01); *Y02D 70/12* (2018.01); *Y02D 70/124* (2018.01); *Y02D 70/126* (2018.01); *Y02D 70/14* (2018.01)

(58) Field of Classification Search
CPC .... Y02D 70/12; Y02D 70/124; Y02D 70/126; Y02D 70/1262; Y02D 70/1264
See application file for complete search history.

(56) References Cited

U.S. PATENT DOCUMENTS

| | | |
|---|---|---|
| 8,588,140 B2 | 11/2013 | Xu et al. |
| 8,638,705 B2 | 1/2014 | Park et al. |
| 8,649,288 B2 | 2/2014 | He et al. |
| 8,792,417 B2 | 7/2014 | Yeoum et al. |
| 8,868,081 B2 | 10/2014 | Heath et al. |
| 9,078,217 B2 | 7/2015 | Ishii |
| 9,237,419 B2 | 1/2016 | Jung et al. |
| 2004/0146018 A1 | 7/2004 | Walton et al. |
| 2004/0180675 A1 | 9/2004 | Choi et al. |
| 2005/0111393 A1 | 5/2005 | Jeong et al. |
| 2006/0281466 A1 | 12/2006 | Gholmieh et al. |
| 2007/0019643 A1 | 1/2007 | Shaheen |
| 2007/0032251 A1 | 2/2007 | Shaheen |
| 2007/0213033 A1 | 9/2007 | Alper et al. |
| 2007/0268877 A1 | 11/2007 | Buckley et al. |
| 2008/0220782 A1* | 9/2008 | Wang ............ H04W 4/08 455/436 |
| 2009/0034452 A1 | 2/2009 | Somasundaram et al. |
| 2009/0170498 A1 | 7/2009 | Venkatasubramanian et al. |
| 2009/0238098 A1 | 9/2009 | Cai et al. |
| 2009/0247176 A1* | 10/2009 | Song ............ H04W 76/38 455/450 |
| 2009/0316637 A1 | 12/2009 | Yi et al. |
| 2010/0075635 A1 | 3/2010 | Lim et al. |
| 2010/0093386 A1 | 4/2010 | Damnjanovic et al. |
| 2010/0177831 A1 | 7/2010 | Kim et al. |
| 2010/0195643 A1 | 8/2010 | Kodali et al. |
| 2010/0296467 A1 | 11/2010 | Pelletier et al. |
| 2010/0317356 A1 | 12/2010 | Roessel et al. |
| 2010/0322217 A1 | 12/2010 | Jin et al. |
| 2011/0003595 A1 | 1/2011 | Shan |
| 2011/0003603 A1 | 1/2011 | Park et al. |
| 2011/0051609 A1 | 3/2011 | Ishii et al. |
| 2011/0085535 A1 | 4/2011 | Shaheen |
| 2011/0098063 A1 | 4/2011 | Richardson |
| 2011/0103328 A1 | 5/2011 | Lee et al. |
| 2011/0158165 A1 | 6/2011 | Dwyer et al. |
| 2011/0170503 A1 | 7/2011 | Chun et al. |
| 2011/0188416 A1 | 8/2011 | Faccin et al. |
| 2011/0194505 A1 | 8/2011 | Faccin et al. |
| 2011/0195668 A1 | 8/2011 | Lee et al. |
| 2011/0249641 A1 | 10/2011 | Kwon et al. |
| 2011/0250910 A1 | 10/2011 | Lee et al. |
| 2011/0269447 A1* | 11/2011 | Bienas ............ H04W 8/22 455/422.1 |
| 2011/0299415 A1 | 12/2011 | He et al. |
| 2012/0020231 A1 | 1/2012 | Chen et al. |
| 2012/0063300 A1 | 3/2012 | Sahin et al. |
| 2012/0176950 A1 | 7/2012 | Zhang et al. |
| 2012/0329458 A1 | 12/2012 | Hjelmgren et al. |
| 2013/0053103 A1 | 2/2013 | Kim et al. |
| 2013/0265866 A1 | 10/2013 | Yi et al. |
| 2013/0294293 A1* | 11/2013 | Iwai ............ H04W 76/20 370/259 |
| 2014/0023032 A1 | 1/2014 | Kim et al. |
| 2014/0242971 A1 | 8/2014 | Lee et al. |
| 2014/0317456 A1 | 10/2014 | Kim et al. |

FOREIGN PATENT DOCUMENTS

| | | | |
|---|---|---|---|
| CN | 101772928 | A | 7/2010 |
| CN | 101841889 | A | 9/2010 |
| CN | 102027798 | A | 4/2011 |
| CN | 102098655 | A | 6/2011 |
| CN | 102170644 | A | 8/2011 |
| EP | 2469939 | A1 | 6/2012 |
| GB | 2461780 | | 1/2010 |
| KR | 10-2005-0032953 | A | 4/2005 |
| KR | 10-2010-0034885 | A | 4/2010 |
| KR | 10-2010-0139098 | A | 12/2010 |
| KR | 20100135679 | A | 12/2010 |
| KR | 10-2011-0010100 | A | 1/2011 |
| KR | 20110000482 | A | 1/2011 |
| KR | 1020110000479 | A | 1/2011 |
| KR | 10-2011-0017520 | A | 2/2011 |
| KR | 10-2011-0049622 | A | 5/2011 |
| KR | 10-2011-0069641 | A1 | 6/2011 |
| KR | 10-2011-0093582 | A | 8/2011 |
| KR | 1020110091305 | A | 8/2011 |
| KR | 1020110093642 | A | 8/2011 |
| RU | 2262811 | C2 | 4/2005 |
| RU | 2009120480 | A | 12/2010 |
| RU | 2411697 | C2 | 2/2011 |
| WO | 9801004 | A2 | 1/1998 |
| WO | 9826625 | A2 | 6/1998 |
| WO | 2008/024788 | A2 | 2/2008 |
| WO | 2008137354 | A1 | 11/2008 |
| WO | 2010121662 | A1 | 10/2010 |
| WO | 2010124228 | A2 | 10/2010 |
| WO | 2010/125969 | A1 | 11/2010 |
| WO | 2011/038625 | A1 | 4/2011 |
| WO | 2011085802 | A1 | 7/2011 |
| WO | 2011093666 | A2 | 8/2011 |
| WO | 2011154761 | A1 | 12/2011 |
| WO | 2012/108811 | A1 | 8/2012 |
| WO | 2012/141483 | 42 | 10/2012 |
| WO | 2013/051836 | A1 | 4/2013 |
| WO | 2013/051912 | A2 | 4/2013 |
| WO | 2013/065995 | A1 | 5/2013 |
| WO | 2013/105790 | A1 | 7/2013 |

OTHER PUBLICATIONS

3GPP TS 23.272 V10.5.0 (Sep. 2011), 3rd Generation Partnership Project; Technical Specification Group Services and System Aspects; Circuit Switched (CS) fallback in Evolved Packet System (EPS); Stage 2 (Release 10), 79 pages.

Motorola, "Solution for Extra Low Power Consumption & Time Controlled," 3GPP TSG SA WG2 Meeting #78, Feb. 22-26, 2010, San Francisco, CA, TD S2-101215, 3 pages.

Ericsson, ST-Ericsson, "Accessibility measurements for MDT," 3GPP TSG-RAN WG2 #76, Oct. 14-18, 2011, San Francisco, CA, Tdoc R2-116148, 3 pages.

Pantech, "IDC trigger procedure," 3GPP TSG-RAN WG2 Meeting #77, Nov. 14-18, 2011, Dresden, Germany, R2-120664, 5 pages.

Alcatel-Lucent, et al., "RA procedure on SCell," TSG-RAN WG#77, Feb. 6-10, 2012, Dresden, Germany, RS-120603, 5 pages.

Alcatel-Lucent, "VLR SGs paging retry," SA WG2 Meeting #87, Oct. 10-14, 2011, Jeju, South Korea, S2-114636, 5 pages.

Huawei, HiSilicon, "Enabling SMS for PS-only," SA WG2 Meeting #87, Oct. 10-14, 2011, Jeju, Korea, S2-114586, 2 pages.

Foreign communication from a related counterpart application, Application No. CN 201280068812.9, Text of the First Office Action dated Apr. 19, 2017, 16 pages.

Foreign communication from a related counterpart application, Application No. CN 201380010349.7, Text of the First Office Action dated May 31, 2017, 14 pages.

(56) References Cited

OTHER PUBLICATIONS

Foreign communication from a related counterpart application, Application No. CN 201380016921.0, Text of the First Office Action dated Jun. 26, 2017, 27 pages.
Foreign communication from a related counterpart application, Application No. CN 201380017677.X, Text of the First Office Action dated Jun. 13, 2017, 16 pages.
Foreign communication from a related counterpart application, Application No. CN 201380018207.5, Text of the First Office Action dated May 12, 2017, 16 pages.
Foreign communication from a related counterpart application, Application No. CN 201380018209.4, Text of the First Office Action dated Jun. 22, 2017, 15 pages.
Foreign communication from a related counterpart application, Application No. JP 2014-545820, Notice of Reasons for Refusal dated May 25, 2017, 10 pages.
Foreign communication from a related counterpart application, Application No. JP 2014-551202, Notice of Reasons for Refusal dated May 30, 2017, 6 pages.
3GPP TR 36.805 V9.0.0, "3rd Generation Partnership Project; Technical Specification Group Radio Access Network; Study on Minimization of Drive-Tests in Next Generation Networks; (Release 9)", Dec. 2009, 24 pages.
WayBack Machine. "23.1 RRC Connection Establishment", www.lte-bullets.com, Aug. 12, 2011, retrieved from internet on Mar. 9, 2017, Long Term Evolution (LTE), 4 pages.
New Postcom, "Consideration on RA Response Window Size for SCell", 3GPP TSG RAN WG2 Meeting #79, R2-123485, Qingdao, China, Aug. 13-17, 2012, 3 pages.
Itri, "Consideration on Random Access on SCell", 3GPP TSG RAN WG2 #74, R2-113192, Barcelona, Spain, May 9-13, 2011, 4 pages.
ASUSTeK, "Issues of Random Access Procedure on SCell", 3GPP TSG-RAN WG2 Meeting #74, R2-112922, Barcelona, Spain, May 9-13, 2011, 4 pages.
Nokia Corporation, et al., "RACH and Carrier Aggregation", 3GPP TSG-RAN WG2 Meeting #68, R2-096844, Jeju, South Korea, Nov. 9-13, 2009, 3 pages.
Decision on Grant dated Jan. 20, 2017 in connection with Russian Application No. 2014106662, 17 pages.
Examination Report No. 4 dated Mar. 10, 2017 in connection with Australian Application No. 2013208385, 7 pages.
European Examination Report dated Mar. 30, 2017 in connection with European Application No. 14167725.2, 8 pages.
"3rd Generation Partnership Project; Technical Specification Group Radio Access Network Extending 850MHz Study Item Technical Report (Release 9)," 3GPP TR 37.806, V1.1.0, Aug. 2011, 77 pages.
"3rd Generation Partnership Project; Technical Specification Group Radio Access Network; Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 10)," 3GPP TS 37.320, V10.4.0, Dec. 2011, 18 pages.
"Multiple Frequency Band Indicators per Cell," 3GPP TSG-RAN WG2 #75, Tdoc R2-114299, Ericsson and ST Ericsson, Athens, Greece, Aug. 22-26, 2011, 5 pages.
"The MDT Applicability of EPLMN," 3GPP TSG-WG2 Meeting #75, R2-114011, Huawei and HiSilicon, Athens, Greece, Aug. 22-26, 2011, 16 pages.
Foreign Communication From a Related Counterpart Application, Australian Application No. 2013208385, Examination Report No. 3 for Standard Patent Application dated Dec. 21, 2016, 6 pages.
Foreign Communication From a Related Counterpart Application, Chinese Application No. 2012800408433, Text of the First Office Action dated Dec. 8, 2016, 10 pages.
Foreign Communication From a Related Counterpart Application, Russian Application No. 2014127861, Decision on Grant dated Nov. 28, 2016, 8 pages.
Foreign Communication From a Related Counterpart Application, Australian Application No. 2017200065, Examination Report No. 1 dated Jan. 10, 2018, 3 pages.
Foreign Communication From a Related Counterpart Application, Russian Application No. 2016139252, Decision on Grant dated Nov. 8, 2017, 15 pages.
Office Action dated Jun. 5, 2018 in connection with Australia Patent Application No. 2017203059.
Office Action dated Jun. 7, 2018 in connection with Canadian Patent Application No. 2,845,779.
Office Action dated Apr. 13, 2018 in connection with European Patent Application No. 12 826 373.8.
European Search Report dated Jun. 7, 2018 in connection with European Patent Application No. 18 16 0008.
"3rd Generation Partnership Project; Technical Specification Group Radio Access Network; Evolved Universal Terrestrial Radio Access (E-UTRA); User Equipment (UE) radio transmission and reception (Release 10)", 3GPP TS 36.101 V10.3.0, Jun. 21, 2011, 237 pages.
InterDigital, "RACH with Carrier Aggregation", 3GPP TSG-RAN WG2 #69bis, Apr. 12-16, 2010, 3 pages, Tdoc R2-102132.
"3rd Generation Partnership Project; Technical Specification Group Radio Access Network; Evolved Universal Terrestrial Radio Access (E-UTRA); Medium Access Control (MAC) protocol specification (Release 11)", 3GPP TS 36.321 V11.0.0, Sep. 21, 2012, 55 pages.
Ericsson et al., "Multiple frequency band indicators per cell", 3GPP TSG-RAN2 Meeting #75, Change Request, Aug. 22-26, 2011, 8 pages, R2-114301.
International Search Report dated Apr. 29, 2013 in connection with International Patent Application No. PCT/KR2013/000303, 5 pages.
Written Opinion of International Searching Authority dated Apr. 23, 2013 in connection with International Patent Application No. PCT/KR2013/000303, 3 pages.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 v10.2.0 (Jun. 2011), 54 pages.
Research in Motion Ltd., "Go to Long Sleep Command for LTE DRX", 3GPP TSG-RAN-WG2 Meeting #61bis, Mar. 31-Apr. 4, 2008, 4 pages, R2-081868.
Samsung, "PS—only high level function description", 3GPP TSG SA WG2 Meeting #89, Feb. 6-10, 2012, 3 pages, TD S2-110485.
Office Action dated Aug. 31, 2018 in connection with Canadian Patent Application No. 2,859,499, 6 pages.
European Search Report dated Nov. 19, 2018 in connection with European Patent Application No. 18 18 6199, 9 pages.
Office Action dated Sep. 13, 2018 in connection with Korean Patent Application No. 10-2012-0140229, 12 pages.
Japan Patent Office, "Notice of Reasons for Refusal," Application No. JP2018-073713, dated Dec. 17, 2018, 9 pages.
Korea Intellectual Property Office, "Office Action," Application No. KR10-2014-7028047, dated Dec. 15, 2018, 8 pages.
Korea Intellectual Property Office, "Office Action," Application No. KR10-2013-0012964, dated Dec. 20, 2018, 12 pages.
Korea Intellectual Property Office, "Office Action," Application No. KR10-2013-0002595, dated Jan. 3, 2019, 11 pages.
Korea Intellectual Property Office, "Office Action," Application No. KR10-2014-7027400, dated Jan. 21, 2019, 12 pages.
3GPP TR 36.805 V9.0.0 (Dec. 2009), Technical Report, 3rd Generation Partnership Project; Technical Specification Group Radio Access Network; Study on Minimization of drive-tests in Next Generation Networks; (Release 9), Dec. 2009, 24 pages.
3GPP TS 22.011 V11.0 (Dec. 2011), Technical Specification, 3rd Generation Partnership Project; Technical Specification Group Services and System Aspects; Service accessibility (Release 11), Dec. 2011, 26 pages.
3GPP TS 36.331 V10.4.0 (Dec. 2011), Technical Specification, 3rd Generation Partnership Project; Technical Specification Group Radio Access Network; Evolved Universal Terrestrial Radio Access (E-UTRA); Radio Resource Control (RRC); Protocol specification (Release 10), Dec. 2011, 296 pages.
Ericsson, et al., "Accessibility measurements for MDT," Tdoc R2-116148, 3GPP TSG-RAN WG2 #76, San Francisco, CA, USA, Oct. 14-18, 2011, 2 pages.

(56) References Cited

OTHER PUBLICATIONS

Ericsson, et al., "SMS over SGs usage to support NAS procedures for PS only SMS," S2-121108 (revision of S2-121043 was S2-120993 was S2-120663), SA WG2 Meeting #89, Vancouver, Canada, Feb. 6-10, 2011, 15 pages.
Huawei, et al., "General consideration of EAB in LTE," R2-113988, 3GPP TSG-RAN WG2 Meeting #75, Athens, Greece, Aug. 22-26, 2011, 3 pages.
Huawei, et al., "Enabling SMS for PS-only," S2-114186, SA WG2 Meeting #87, Jeju, Korea, Oct. 10-14, 2011, 8 pages.
Huawei, et al., "Support for Enhanced UE Battery Saving," S2-120715 (revision of S2-12xxxx), SA WG2 Meeting #89, Vancouver, Canada, Feb. 6-10, 2012, 40 pages.
LG Electronics Inc, "EAB model in UE," R2-114456, 3GPP TSG-RAN WG2 #75, Athens, Greece, Aug. 22-26, 2011, 4 pages.
Ericsson et al., "Registration of MME for SMS", SA WG2 Meeting #93, Oct. 8-12, 2012, 12 pages, S2-124181.
"3rd Generation Partnership Project; Technical Specification Group Services and System Aspects; Circuit Switched (CS) fallback in Evolved Packet System (EPS); Stage 2 (Release 10)", 3GPP TS 23.272 V10.5.0 (Sep. 2011), 79 pages.
Intel Corporation, "Configuration of multiple TA in Rel-11 CA", 3GPP TSG RAN2#74 meeting, May 9-13, 2011, 5 pages, R2-113215.
InterDigital Communications, "Support for multiple Timing Advance in LTE CA", 3GPP TSG-RAN WG2 #74, May 9-13, 2011, 5 pages, Tdoc R2-113255.
Huawei, HiSilicon, "Discussion on TA group management", 3GPP TSG-RAN WG2 Meeting #74, May 9-13, 2011, 4 pages, R2-113285.
Pantech, "IDC trigger procedure", 3GPP TSG-RAN WG2 Meeting #77, Nov. 14-18, 2011, 5 pages, R2-120664.
NTT Docomo, "Further discussions on LTE-A UE categories/capabilities", 3GPP TSG-RAN WG4 Ad-hoc meeting #2010-04, Oct. 11-15, 2010, 5 pages, R4-103470.
Alcatel-Lucent, Alcatel-Lucent Shanghai Bell, "RA procedure on SCELL", TSG-RAN WG2 #77, Feb. 6-10, 2012, 5 pages, R2-120603.
Communication pursuant to Article 94(3) EPC dated Apr. 4, 2019 in connection with European Patent Application No. 13 736 123.4, 4 pages.
Decision of Grant dated Apr. 10, 2019 in connection with Korean Patent Application No. 10-2012-0112390, 7 pages.
Decision of Grant dated May 2, 2019 in connection with Korean Patent Application No. 10-2019-7009763, 7 pages.
Office Action dated May 21, 2019 in connection with Korean Patent Application No. 10-2013-0006771, 9 pages.
Office Action dated Mar. 14, 2019 in connection with Korean Patent Application No. 10-2012-0140229, 16 pages.
Office Action dated Mar. 13, 2019 in connection with Korean Patent Application No. 10-2013-0004568, 8 pages.
Office Action dated Mar. 18, 2019 in connection with Korean Patent Application No. 10-2012-0087760, 8 pages.
Office Action dated Jun. 6, 2019 in connection with Canadian Patent Application No. 2,859,499, 4 pages.
European Search Report dated Jul. 3, 2019 in connection with European Patent Application No. 19 16 5270, 10 pages.
Ericsson, ST-Ericsson, "Multiple frequency band indicators per cell", 3GPP TSG-RAN WG2 #75, Aug. 22-26, 2011, 5 pages, Tdoc R2-114299.
"3rd Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.4.0 (Dec. 2011), 54 pages.
Office Action dated Nov. 28, 2019 in connection with Korean Patent Application No. 10-2013-0006771, 9 pages.
Office Action dated Feb. 5, 2020 in connection with Korean Patent Application No. 10-2019-0169542, 10 pages.
Decision on Patent dated Dec. 19, 2019 in connection with Korean Patent Application No. 10-2012-0140229, 8 pages.
European Patent Office, "European Search Report," Application No. 19179723.2, dated Oct. 24, 2019, 6 pages.
Intellectual Property India, "Examination report under sections 12 & 13 of the Patents Act, 1970 and the Patents Rules, 2003," Application No. IN 3851/KOLNP/2013, dated Sep. 18, 2019, 8 pages.
Korean Intellectual Property Office, "Decision on Patent," Application No. KR 10-2013-0002595, dated Sep. 5, 2019, 7 pages.
Korean Intellectual Property Office, "Office Action," Application No. KR 10-2012-0087760, dated Oct. 23, 2019, 9 pages.
Ericsson, et al., "Introduction of relays in MAC," R2-105210, 3GPP TSG-RAN WG2 Meeting #71, Madrid, Spain, Aug. 23-27, 2010, 51 pages.
Huawei, et al., "Consideration on coverage optimization," R2-115885, 3GPP TSG-RAN WG2 Meeting #76, San Francisco, USA, Nov. 14-18, 2011, 2 pages.
Research in Motion UK Limited, "Interference measurement for BT," R2-120183, 3GPP TSG-RAN WG2 Meeting #77, Dresden, Germany, Feb. 6-10, 2012, 6 pages.
Texas Instruments, "Increasing Sounding Capacity for LTE-A," R1-100745, 3GPP TSG RAN WG1 #59bis, Valencia, Spain, Jan. 18-22, 2010, 5 pages.
Decision of Patent dated Feb. 26, 2020 in connection with Korean Patent Application No. 10-2012-0087076, 5 pages.

* cited by examiner

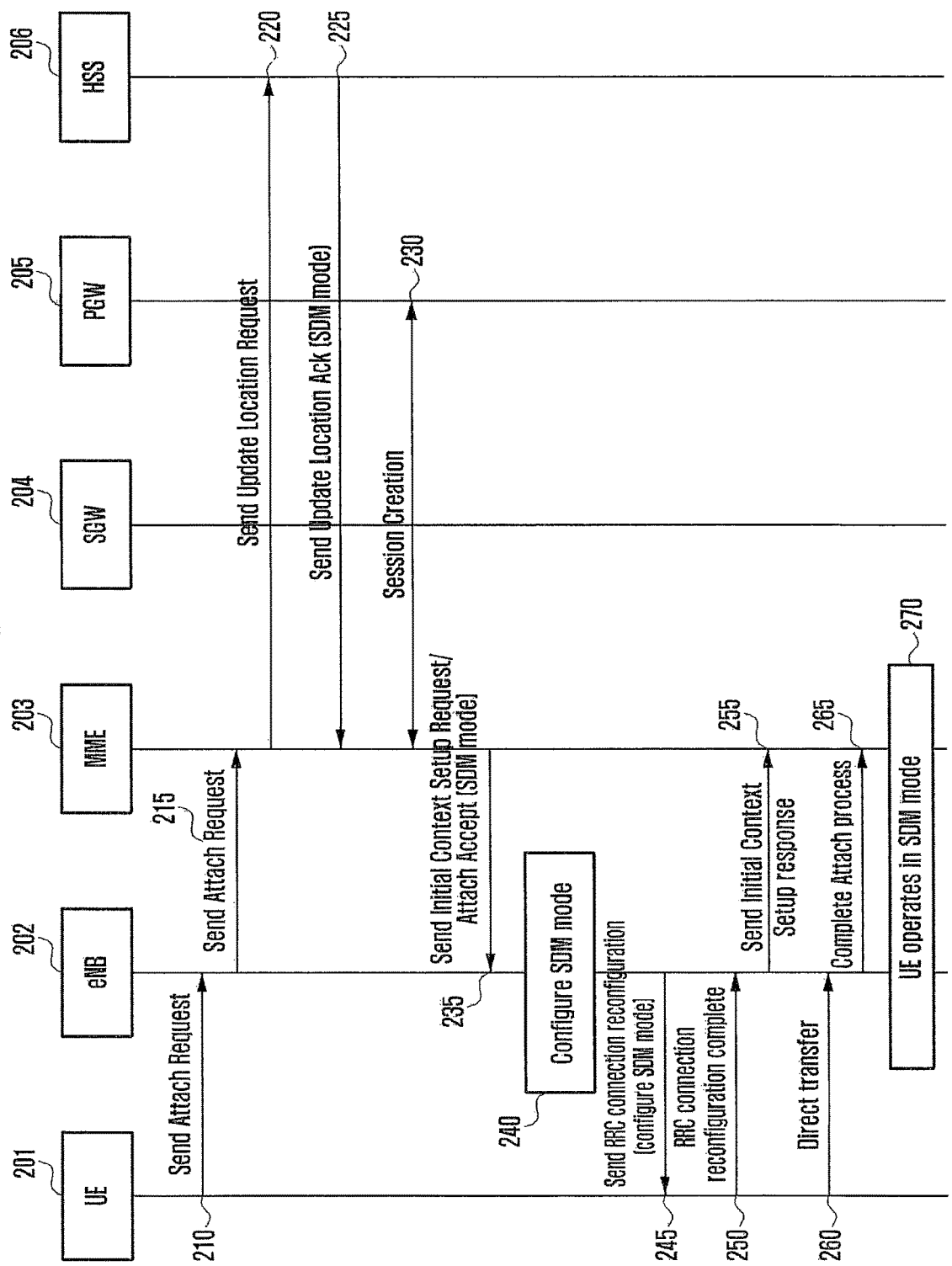

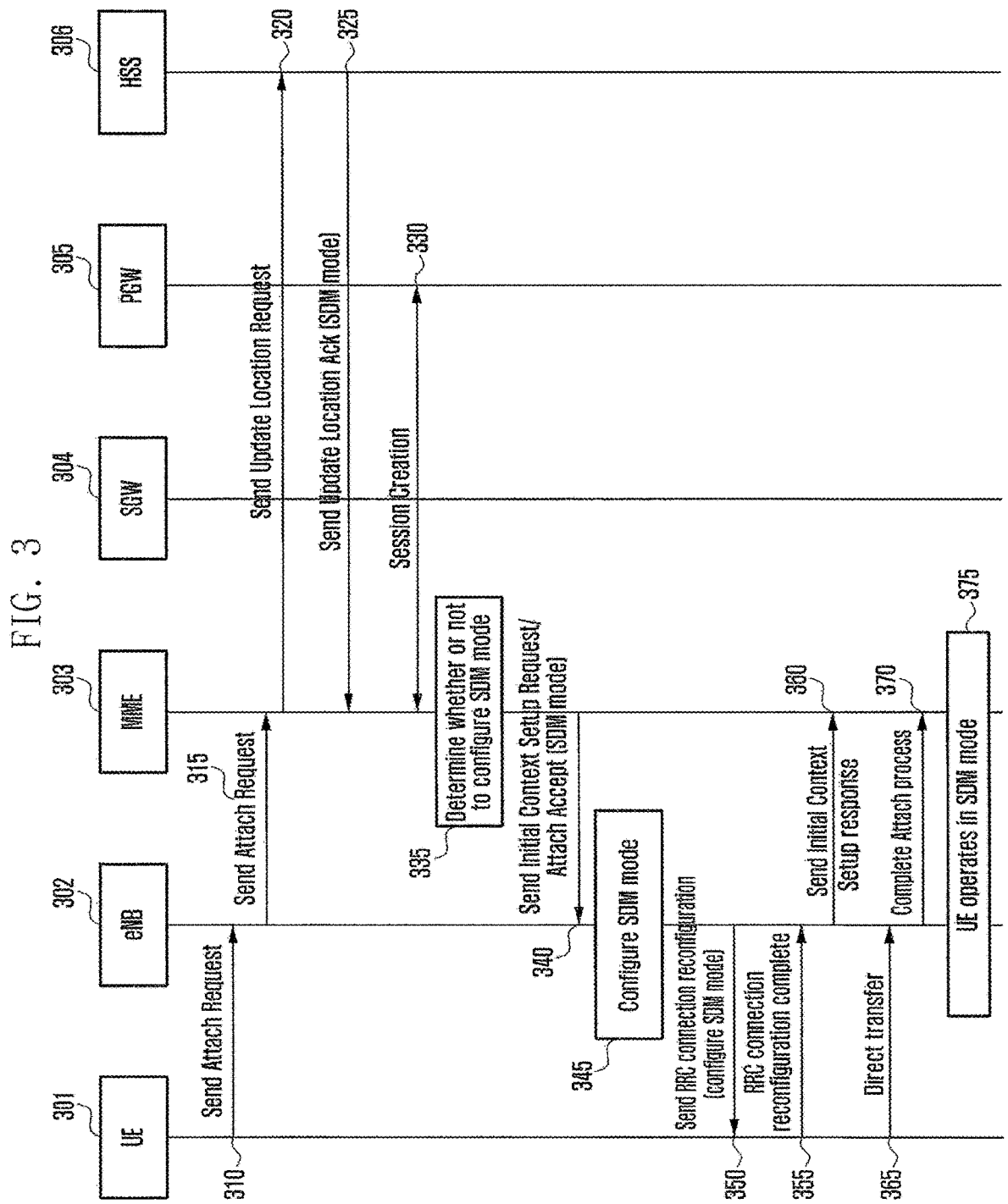

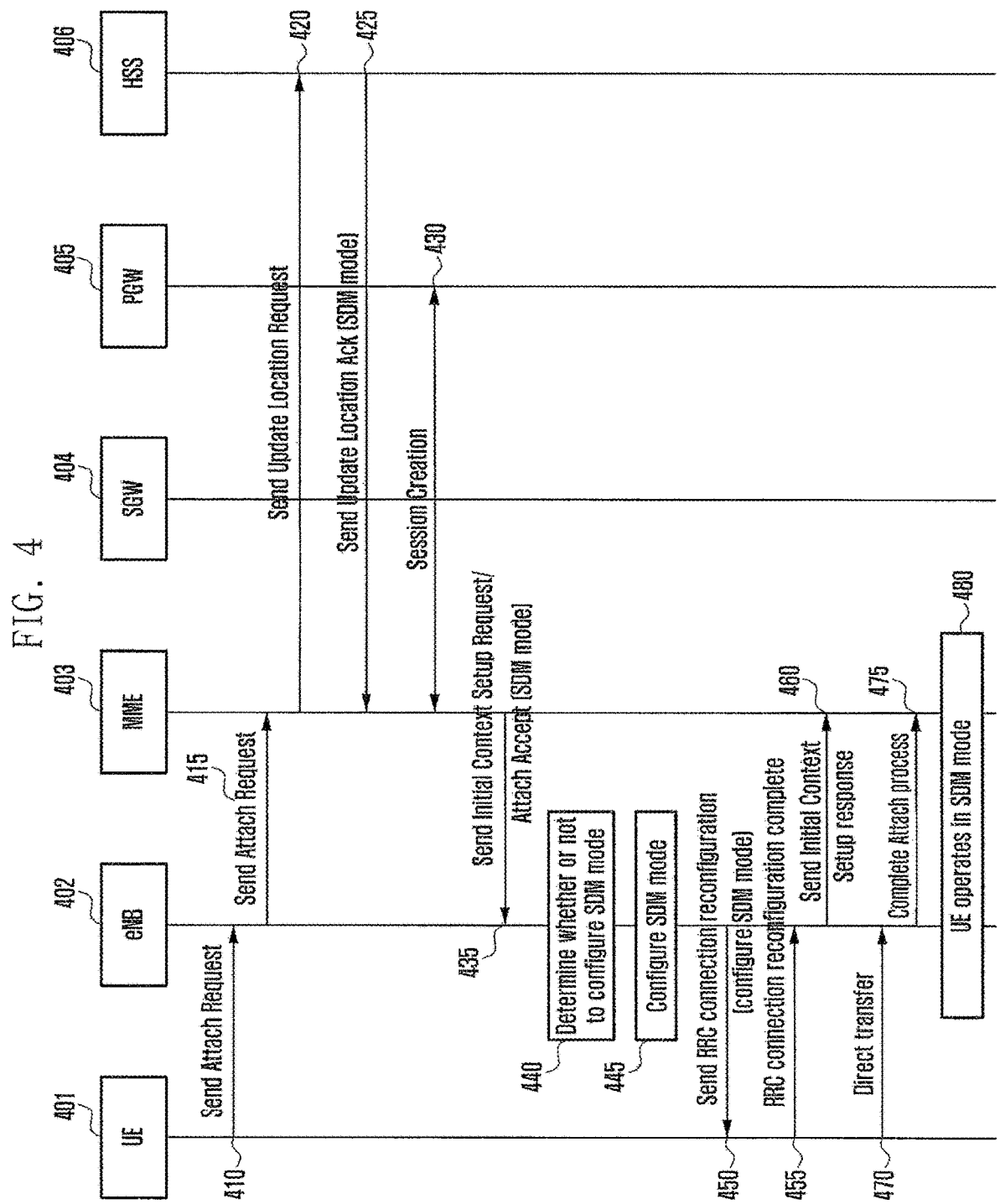

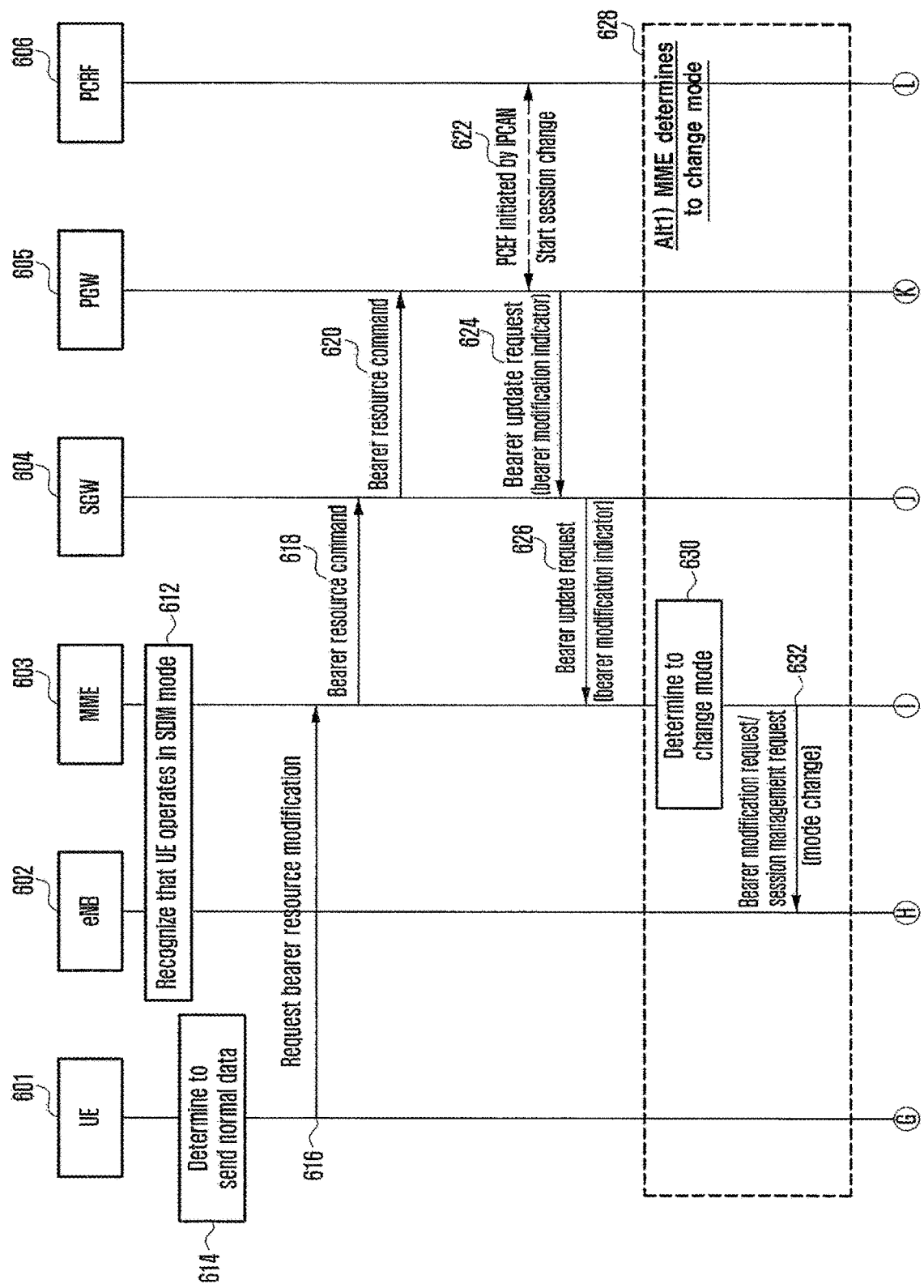

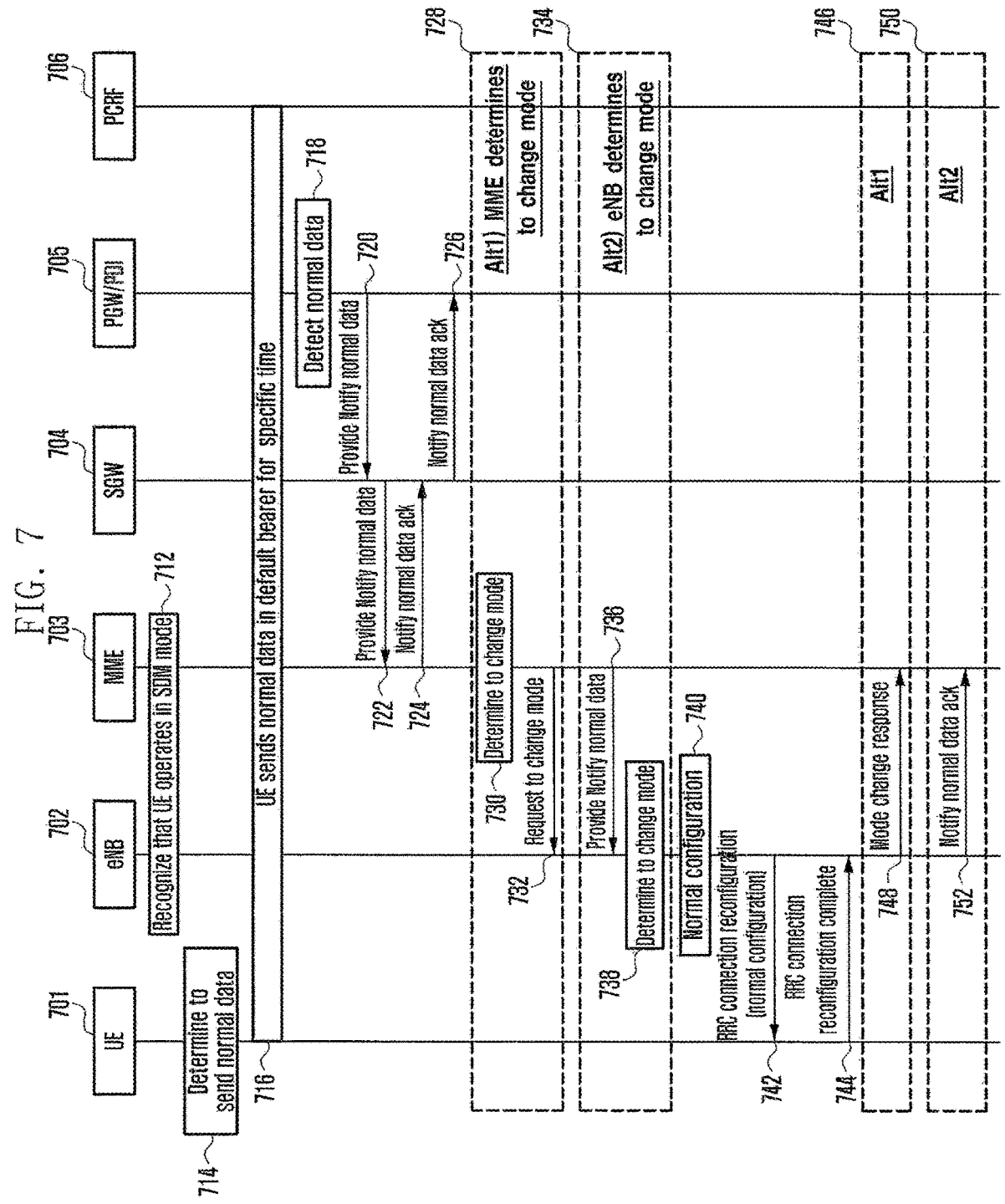

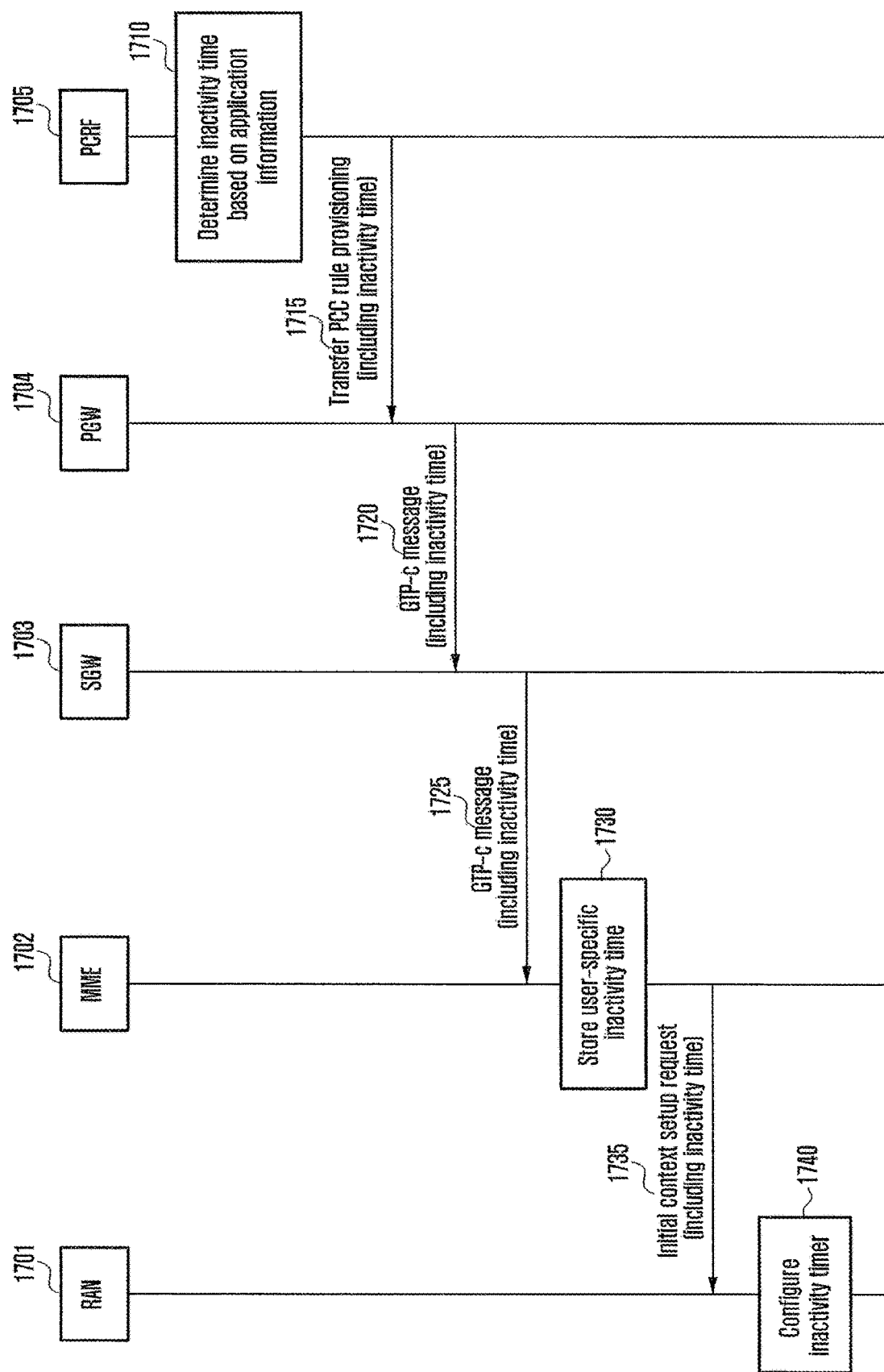

METHOD AND APPARATUS FOR EFFICIENTLY TRANSMITTING SMALL AMOUNTS OF DATA IN WIRELESS COMMUNICATION SYSTEMS

CROSS-REFERENCE TO RELATED APPLICATIONS AND CLAIM OF PRIORITY

This application is a continuation of U.S. patent application Ser. No. 14/377,150 filed on Aug. 6, 2014, which is a 371 of International Patent Application No. PCT/KR2013/000303 filed on Jan. 15, 2013, which claims priority to U.S. Provisional Patent Application No. 61/595,646 filed on Feb. 6, 2012 and Korean Patent Application No. 10-2012-0075216 filed on Jul. 10, 2012, the disclosures of which are herein incorporated by reference in their entirety.

BACKGROUND

1. Field

The present disclosure relates to a wireless communication system and, more particularly, to a method of reducing a signaling load occurring due to the frequent transmission of small data and to a method of maintaining a terminal in a connected state.

2. Description of Related Art

In a wireless communication system, a terminal is in a connected state in which radio resources have been assigned to the terminal when sending and receiving data, and switches to an idle state in which the radio resources have been released after completing the transmission and reception of the data. The terminal in the idle state performs signaling for being assigned radio resources in order to send and receive data again.

If a variety of kinds of terminal applications are frequently used at the same time these days, a terminal frequently generates small data, such as keep-alive and state transition. In such a case, the terminal frequently performs signaling for the assignment and release of radio resources and core network resources in order to send and receive data, which generates a signaling load on a network.

Furthermore, if a terminal frequently sends and receives small data, the terminal frequently repeats the connected state and the idle state. This makes a network repeatedly perform S1 connection and data radio bearer establishment, that is, network resources between a base station and an MME, thus experiencing a load.

Accordingly, there is a need for a method of efficiently processing a repetitive and small amount of data.

Meanwhile, various types of data applications could have become executed in a terminal at the same time due to the introduction of a smart phone. For example, a chatting program, a web browser, and streaming players may send and receive data at the same time. In particular, many applications that periodically access a network and exchange small data have occurred, and an example thereof includes a chatting program or a push service program. A variety of kinds of such applications may have different data occurrence cycles. For example, in general, a chatting program or push service exchanges data once every 5 seconds, whereas there may be a situation in which a web browser sends data once every several minutes to several hours.

Today, in the case where a terminal has set up RRC connection with a base station, if the activity of a user, that is, data activity, is not present for a specific time, the base station releases the RRC connection in order to prevent the waste of resources. That is, the base station releases the RRC connection if the activity of the terminal is not present until a timer value expires using an inactivity timer. Today, the value of the inactivity timer may be voluntarily set by the base station. Accordingly, since information about a user, that is, information about an application operating on a terminal, is not considered, precise conditions for the terminal is not considered, which may result in the repetition of the frequent setup and release of RRC connection.

SUMMARY

The present disclosure has been made in order to solve the above problems, and relates to a method of reducing a signaling load occurring due to the frequent transmission of small data and to a method of maintaining a terminal in a connected state.

Furthermore, the present disclosure has been made in order to solve the above problems, and relates to a method of controlling the time when connection between a terminal and a base station is maintained depending on the characteristics of a user.

In order to achieve the objects, a method in a Mobility Management Entity (MME) determining communication mode of User Equipment (UE) in a communication system in accordance with an embodiment of the present disclosure includes operations of receiving an access request comprising information about the location of the UE; receiving information about specific locations of the UE from a Home Subscriber Server (HSS) based on the received access request; comparing the information about the location of the UE with the information about the specific locations; and determining the communication mode of the UE based on a result of the comparison.

An MME apparatus determining communication mode of UE in a communication system in accordance with another embodiment of the present disclosure includes a transceiver receiving an access request, including information about the location of the UE, from the UE, sending a message to an HSS based on the received access request, and receiving information about specific locations for configuring a first mode from the HSS; and a control unit comparing the information about the location of the UE with the information about the specific locations and determining the communication mode of the UE based on a result of the comparison.

A method in an MME determining communication mode of UE in accordance with another embodiment of the present disclosure includes operations of receiving an access request transmitted by the UE; sending a location update request to an HSS based on the received access request; receiving information about the state of the UE from the HSS; and transferring first information, including the received information about the state of the UE, to an eNodeB (eNB).

A method in an eNB determining communication mode of UE in accordance with another embodiment of the present disclosure includes operations of receiving information about the state of the UE from an MME; configuring the communication mode of the UE based on the received information about the state of the UE; and sending first information, including the configured communication mode of the UE, to the UE.

A method in an MME determining a change of communication mode of UE in accordance with another embodiment of the present disclosure includes operations of receiving a bearer resource change request from the UE; sending a bearer resource command based on the received bearer resource change request; receiving information related to a bearer assigned to the UE; and sending one or more of a bearer setup request and a session management request to an eNB based on a request that generates the received bearer.

A method in an eNB determining a change of communication mode of UE in accordance with yet another embodiment of the present disclosure includes operations of receiving one or more of a bearer setup request and a session management request from an MME; configuring the connection mode of the UE based on information including the received requests; and sending information related to the configured mode to the UE.

In accordance with the present disclosure, the frequent transmission of small data can be efficiently supported.

BRIEF DESCRIPTION OF THE DRAWINGS

FIG. 2 is a diagram illustrating a scheme for configuring UE in small data management mode when the UE according to an embodiment accesses a network in order to be provided with service.

FIG. 3 is a diagram illustrating a scheme for configuring corresponding UE in small data management mode when the UE according to an embodiment accesses a network in order to be provided with service.

FIG. 4 is a diagram illustrating a scheme for configuring corresponding UE in small data management mode when the UE according to an embodiment accesses a network in order to be provided with service.

FIGS. 6A and 6B are diagram illustrating that an MME or eNB according to an embodiment perform a change from small data management mode to connected mode.

FIG. 7 is a diagram illustrating that a PGW according to an embodiment transfers mode change information to an MME or an eNB using a new message proposed by the present disclosure.

FIG. 17 is a diagram illustrating a method of setting an inactivity timer by taking into consideration the traffic characteristic of a service application of UE according to an embodiment.

DETAILED DESCRIPTION

Hereinafter, embodiments of the present disclosure are described in detail with reference to the accompanying drawings.

Preferred embodiments of the present disclosure are described in detail below with reference to the accompanying drawings. In this case, a detailed description of known functions or constructions that may make the gist of the present disclosure vague is omitted.

Furthermore, in describing the embodiments of the present disclosure in detail, an Evolved Packet System (EPS) will be a major target, but the main gist of the present disclosure may be applied to other communication systems having a similar technical background with a slight modification within the scope that does not greatly depart from the scope of the present disclosure. This is possible by those skilled in the art to which the present disclosure pertains.

Figure 1:
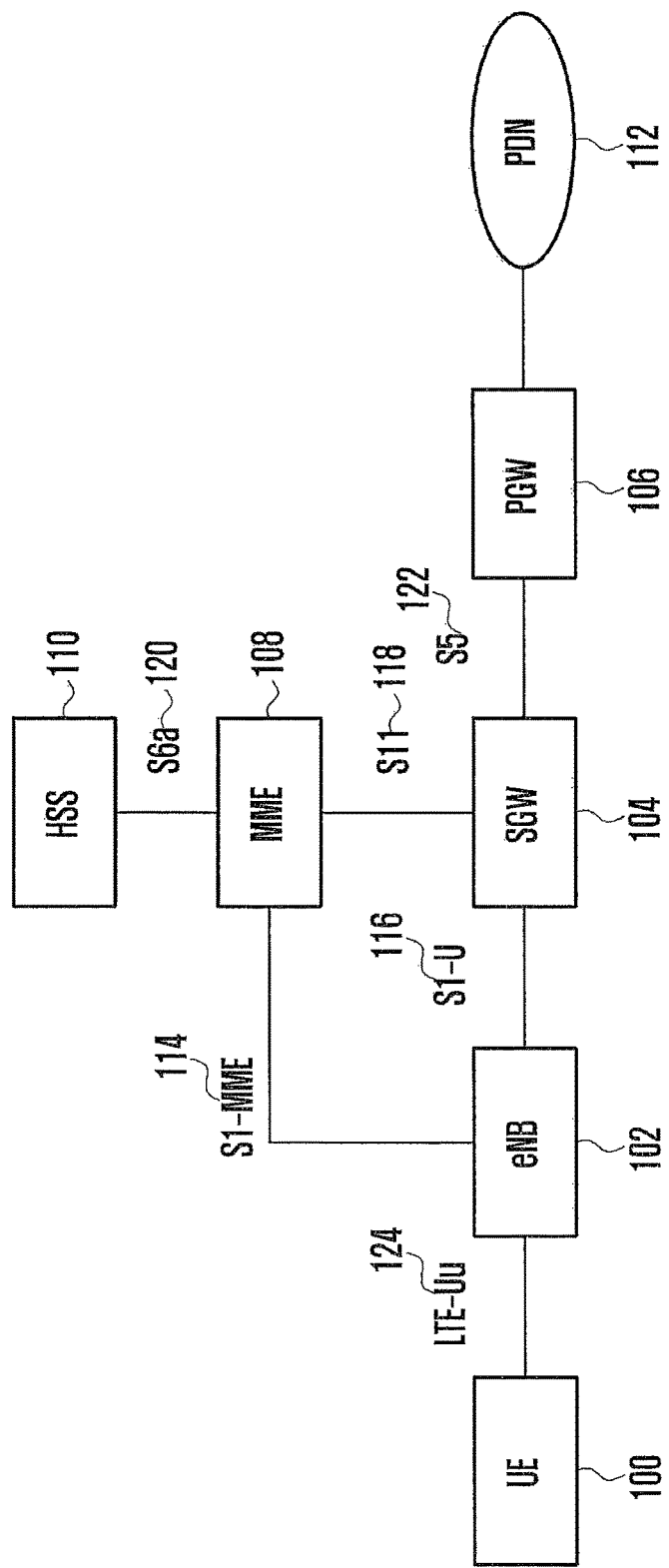
FIG. 1 is a block diagram illustrating the configuration of an EPS in accordance with an embodiment of the present disclosure.

FIG. 1 is a block diagram illustrating the configuration of an EPS in accordance with an embodiment of the present disclosure.

FIG. 1 illustrates only entities that belong to entities forming the EPS and that are related to an embodiment, and additional entities that are not illustrated may be present in the EPS. Furthermore, a description of the following entities is given for only some related to the present disclosure, and additional functions may be included.

Referring to FIG. 1, User Equipment (UE) 100 is indicative of a terminal. An eNB 102 is an entity that controls radio resources and is connected to the UE 100 through a radio channel. An MME is a Mobility Management Entity 108. The MME manages the UE 100 in idle mode, and is capable of performing functions related to the roaming and authentication of the UE.

Furthermore, the MME 108 processes bearer signals generated by the UE 100. An HSS is a Home Subscriber Server 110. The HSS stores subscription information about each UE 100, and transfers information related to the UE 100 to the MME 108 when the UE 100 accesses a network so that the MME 108 uses the information to control the UE 100.

A serving gateway (SGW) 104 manages the user bearer of the UE, and notifies the MME 108 of the arrival of data when the data reaches the UE 100. The PGW 106 receives data to be delivered to the UE 100 from a service network, or receives data to be delivered to a service network from the UE 100. Furthermore, the PGW 106 has a policy for processing data.

In the EPS, the UE 100 establishes a radio bearer with the eNB 102 in order to send and receive data, and the eNB 102 and the MME 108 perform context setup and establish S1 connection. When specific conditions are satisfied after the transmission and reception of data are completed, the MME 108 or the eNB 102 release eNB context. This includes that S1 connection is immediately released. Furthermore, the eNB 102 performs RRC connection release from the UE 100 so that the UE 100 shifts to an idle state.

Each of the UE 100, the eNB 102, the SGW 104, the PGW 106, the MME 108, the HSS 110, and a PDN 112 in accordance with an embodiment of the present disclosure may include a transceiver capable of exchanging data with other elements and a control unit capable of controlling the operation of each of the elements including the transceivers.

In contents to be described later, a network may include the elements of an EPS other than the UE 100, and may also be represented as a net.

In an embodiment, there is proposed a method for reducing a signaling load occurring due to the frequent transmission of small data.

First, an embodiment proposes a scheme for maintaining the UE 100, not having ongoing data, in connected mode. Through such a method, the shift of a UE state that occurs when the UE 100 frequently sends and receives small data can be minimized.

Next, the present disclosure proposes a scheme for minimizing frequency of mobility-related operations that are performed by the UE 100 in connected mode that sends and receives small data with respect to the network. The consumption of the battery can be minimized because the UE remains in connected mode by minimizing frequency of mobility-related operations.

In an embodiment, small data management mode in which the UE 100 is managed in the network may be defined. In this case, small data may include a low data rate at which the UE 100 sends and receives a keep-alive message or a state transition message and delay-tolerant background data.

Small data management mode is mode in which the UE 100 is sending and receiving small data or the UE 100 is connected, but may be mode in which the network manages the UE 100 if there is no data transmitted and received.

Small data management mode may be determined by the network.

In an embodiment, when the UE 100 enters small data management mode, the network controls a state value within the UE 100 so that the UE 100 performs a radio state measurement report with frequency smaller than that in connected mode, and sets an inactivity timer in order to control the time when the UE 100 shifts to idle mode.

Small data management mode proposed by the present disclosure may basically include three types.

The three types include a mode decision, a mode configuration, and a mode change.

The mode decision may include determining whether or not the network configures the UE 100 in small data management mode when the UE 100 accesses the network.

The mode configuration includes that the network controls the configuration of the UE so that the UE enters small data management mode or enters connected mode and performs the configurations of network entities.

The mode change includes that the network changes the UE from small data management mode to connected mode so that the UE 100 sends and receives normal data. The normal data may include one or more of voice and video data transmitted and received by the UE.

Furthermore, the mode change includes a change from connected mode to small data management mode or idle mode. Furthermore, the mode change may include a change from idle mode to small data management mode.

In the mode decision, when the UE 100 accesses the network, the network may determine whether or not to configure the UE 100 in small data management mode.

An embodiment proposes a method of determining, by the network, configuring the UE 100 in small data management mode.

The method proposed by the embodiment may include:
1) a method of complying with subscription data stored in the HSS 110,
2) a method of selecting, by the MME 108, the UE 100 to which small data management mode will be applied with reference to subscription data stored in the HSS 110,
3) a method of referring to, by the eNB 102, subscription data stored in the HSS 110 or selecting the UE 100 to which small data management mode will be applied depending on network conditions, and
4) a method of applying, by the MME, small data management mode to UE depending on the mobility of the corresponding UE.

FIG. 2 is a diagram illustrating a scheme for configuring UE 201 in small data management mode in accordance with subscription data stored in an HSS 206 when the UE according to an embodiment accesses a network in order to be provided with service.

Referring to FIG. 2, the UE 201 sends an access request message to an MME 203 in order to access the network, and the MME 203 receives subscription information from the HSS 206 and transfers the received subscription information to an eNB 202. After performing a mode configuration, the eNB 202 transfers information about the configuration to the UE 201. After connection is completed, the eNB 202 and the MME 203 manage the UE in small data management mode.

At operation 210, the UE 201 may send an Attach Request message to the eNB 202.

At operation 215, the eNB 202 may transfer the received Attach Request message to the MME 203.

At operation 220, the MME 203 may send an Update Location Request to the HSS 206 based on the received Attach Request message.

At operation 225, the HSS 206 may send an Update Location Ack to the MME 203 based on the received Update Location Request so that the UE 201 is UE in which small data management mode needs to be configured.

Information including whether or not the UE 201 needs to be configured in small data management mode may be included in the Update Location Ack message as a new parameter or may be included in part of UE subscription data and may be transmitted. In an embodiment, Small Data Management (SDM) mode may include both the aforementioned two methods.

At operation 230, the MME 203 may establish the PDN connection of the UE 201 by performing session creation with a PGW 205.

At operation 235, the MME 203 may notify the eNB 202 that the UE 201 is in SDM mode through one or more of Initial Context Setup Request and Attach Accept messages. What the MME 203 notifies the eNB 202 that the UE 201 is in SDM mode may be included in one or more of the Content Setup Request and Attach Accept messages as a new parameter or may be included in part of UE subscription data and may be transmitted. SDM mode may include both the aforementioned two methods.

At operation 240, the eNB 202 may perform a mode configuration based on SDM mode information received at operation 235.

At operation 245, the eNB 202 sends information about mode set at operation 240 to the UE 201. The configured mode information may be transmitted to the UE 201 through an RRC connection reconfiguration message.

At operation 250 to operation 270, the UE 201, the eNB 202, and the MME 203 may perform the remaining Attach process.

FIG. 3 is a diagram illustrating a scheme in which when UE 301 according to an embodiment accesses a network in order to be provided with service, an MME 303 selects UE to which SDM mode will be applied with reference to subscription data stored in an HSS 306 and configures the corresponding UE in SDM mode.

The UE 301 sends an access request message to the MME 303 in order to access the network, and the MME 303 receives subscription information from the HSS 306. The subscription data includes whether or not to allow the user of the corresponding UE 301 configures the corresponding UE 301 in SDM mode. Alternatively, the subscription data may include whether or not a service provider wants to configure corresponding UE in SDM mode. The MME 303 determines whether or not to configure the corresponding UE 301 in SDM mode with reference to the information.

The MME 303 transfers information indicative that the UE is in SDM mode to an eNB 302. After performing a mode configuration, the eNB 302 transfers configuration information to the UE.

At operation 310, the UE 301 may send an Attach Request message to the eNB 302.

At operation 315, the eNB 302 may transfer the received Attach Request message to the MME 303.

At operation 320, the MME 303 may send an Update Location Request message to the HSS 306 based on the received Attach Request message.

At operation 325, the HSS 306 may send an Update Location Ack to the MME 303 based on the received Update Location Request message in order to notify that the UE 301 is UE in which SDM mode needs to be configured.

Information including whether the UE 301 needs to be configured in SDM mode may be included in the Update Location Ack message as a new Parameter or may be included in part of UE subscription data and may be transmitted. In an embodiment, SDM mode may include both the aforementioned two methods.

At operation 330, the MME 303 may establish the PDN connection of the UE 301 by performing session creation with a PGW 305.

At operation 335, the MME 303 may determine whether or not to configure the corresponding UE 301 in SDM mode based on one or more of the pieces of information received at operation 325 and operation 330.

At operation 340, the MME 303 may notify the eNB 302 that the UE 301 is in SDM mode through one or more of Initial Context Setup Request and Attach Accept messages. What the MME 303 notifies the eNB 302 that the UE 301 is in SDM mode may be included in one or more of the Content Setup Request and Attach Accept messages as a new parameter or may be included in part of the UE subscription data and may be transmitted. SDM mode may include both the aforementioned two methods.

At operation 345, the eNB 302 may perform a mode configuration based on SDM mode information received at operation 340.

At operation 350, the eNB 302 sends information about mode configured at operation 345 to the UE 301. The configured mode information may be transmitted to the UE 301 through an RRC connection reconfiguration message.

At operation 355 to operation 375, the UE 301, the eNB 302, and the MME 303 may perform the remaining Attach process.

FIG. 4 is a diagram illustrating that an eNB 402 according to an embodiment determines and configures UE to which SDM mode will be applied.

FIG. 4 is a diagram illustrating a scheme in which when UE 401 accesses a network in order to be provided with service, the eNB 402 selects the UE 401 to which SDM mode will be applied with reference to subscription data stored in an HSS 406 and configures the corresponding UE 401 in SDM mode.

The eNB 402 determines whether or not to configure the corresponding UE 401 in SDM mode based on network conditions or based on information included in subscription data received from an MME 403.

At operation 410, the UE 401 may send an Attach Request message to the eNB 402.

At operation 415, the eNB 402 may transfer the received Attach Request message to the MME 403.

At operation 420, the MME 403 may send an Update Location Request message to the HSS 406 based on the received Attach Request message.

At operation 425, the HSS 406 may send an Update Location Ack to the MME 403 based on the received Update Location Request message in order to be indicative that the UE 401 is UE in which SDM mode needs to be configured.

Information including whether or not the UE 401 needs to be configured in SDM mode may be included in the Update Location Ack message as a new parameter or may be included in part of the UE subscription data and may be transmitted. In an embodiment, SDM mode may include both the aforementioned two methods.

At operation 430, the MME 403 may establish the PDN connection of the UE 401 by performing session creation with a PGW 405.

At operation 435, the MME 403 may notify the eNB 402 that the UE 401 is in SDM mode through one or more of Initial Context Setup Request and Attach Accept messages. What the MME 403 notifies the eNB 402 that the UE 401 is in SDM mode may be included in one or more of the Content Setup Request and Attach Accept messages as a new parameter or may be included in part of the UE subscription data and may be transmitted. SDM mode may include both the aforementioned two methods.

At operation 440, the eNB 402 may determine whether or not to configure the corresponding UE 401 in SDM mode based on the information received at operation 435.

At operation 445, the eNB 302 may perform a mode configuration based on information determined at operation 440.

At operation 450, the eNB 402 sends information about mode configured at operation 445 to the UE 401. The configured mode information may be transmitted to the UE 401 through an RRC connection reconfiguration message.

At operation 455 to operation 480, the UE 401, the eNB 402, and the MME 403 may perform the remaining Attach process.

After completing the Attach process, the UE may operate in SDM mode having a default bearer.

If the UE configured in SDM mode through the embodiments 1), 2), and 3) perform handover, information indicative that the UE has been configured in SDM mode may be transferred from a source network to a target network.

In an embodiment, S1-based handover in which an MME is changed is described as an example below. A source MME may transfer information, including that UE has been configured in SDM mode, to a target MME. The target MME may transfer the information from the source MME to a target eNB. The target eNB performs an SDM mode configuration, and transfers the configuration to the target MME. The target MME may transfer the configuration, received from the target eNB, to the UE through the source MME and a source eNB. The information indicative that the UE has been configured in SDM mode and the SDM mode configuration may be included in messages, exchanged when handover is performed, in the form of UE context. Furthermore, according to an embodiment, the information indicative that the UE has been configured in SDM mode and the SDM mode configuration may be transferred from the source eNB to the source MME.

In another embodiment of the present disclosure, an MME determines whether or not to apply SDM mode depending on the mobility of UE and configures SDM mode.

For example, when the UE enters a specific area, such as a home or an office, a probability that handover may occur may be suddenly reduced because mobility is sharply reduced. In such a case, optimum conditions in which SDM mode is applied may be achieved because a handover load occurring when the UE remains in connected mode for a long time is reduced.

In the present embodiment, the MME may determine whether or not to apply SDM mode depending on the mobility of the UE. For example, if the UE moves at high speed, the MME does not apply SDM mode. If the UE moves at low speed, the MME applies SDM mode. Furthermore, if the UE is placed in a specific area determined to have small mobility, the MME may apply SDM mode.

In accordance with an embodiment of the present disclosure, the subscription data may include information related to an area in which the mobility of the UE has been sharply reduced and to which SDM mode may be applied. Alternatively, information about the mobility of the UE measured by the network may be included in the subscription data.

Table 1 is a diagram illustrating an example of the subscription data included in the HSS according to an embodiment.

TABLE 1

| Field | Description |
| --- | --- |
| Small data area | Indicates the area/location (e.g., a TA, an RA, a cell) for long connected mode |
| UE mobility | Indicates the mobility of the UE (e.g., MDT information) |

The HSS may include a 'small data area' field proposed by the present disclosure. The small data area includes an area/location to which SDM mode is preferably applied. The area may have any form that includes one or more of a tracking area, a routing area, a cell, a home, and an office. More specifically, if SDM mode is applied, the small data area may be an area where a signaling load between an eNB and an MME may be further reduced. Information about the small data area may have been recorded on the HSS based on a previously measured value. Furthermore, the HSS may include a 'UE mobility' field. The value of the UE mobility may include information about the mobility of the UE. According to an embodiment, a network may include mobility information including the speed of the UE that has been collected through an MDT.

Figure 11:
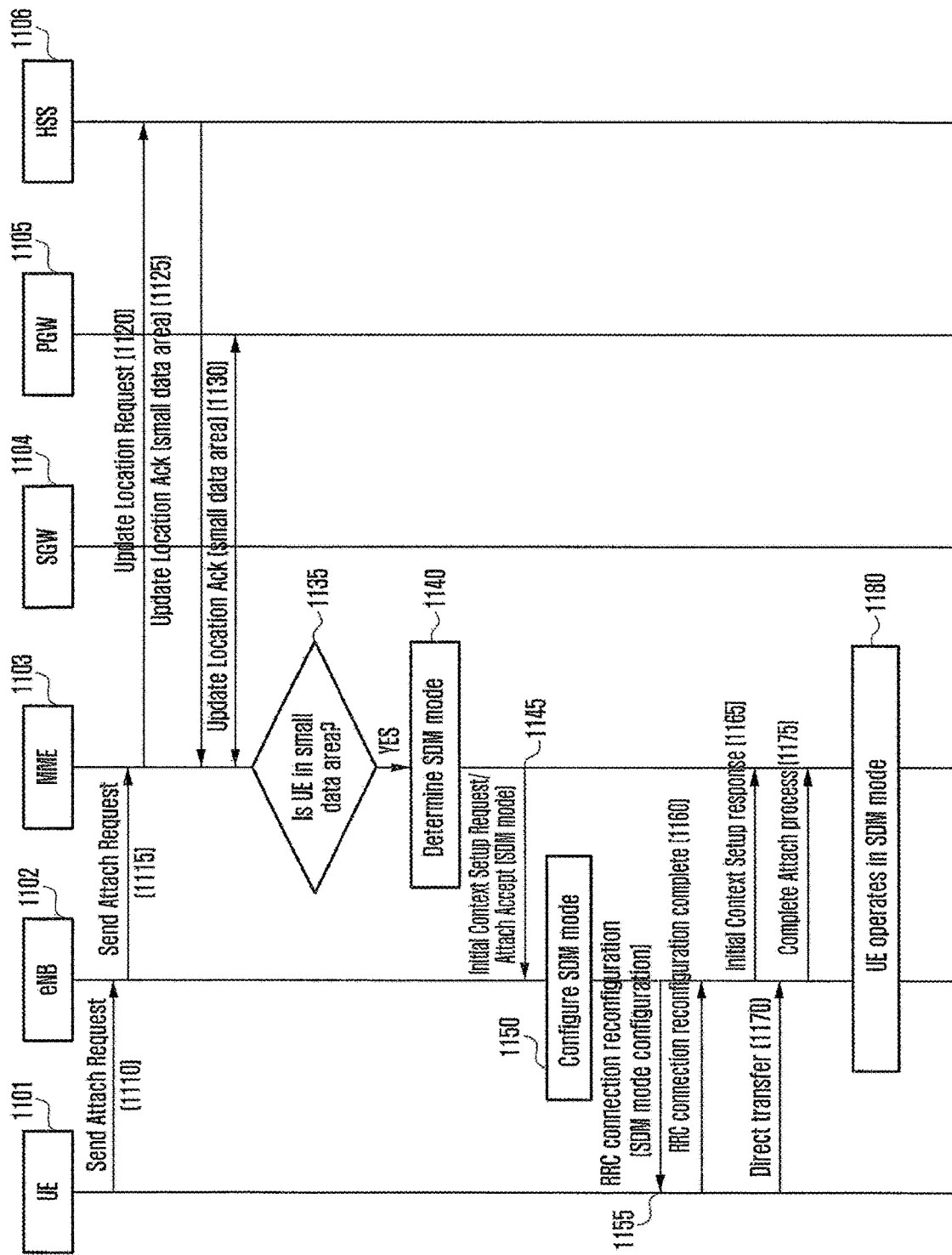
FIG. 11 is a diagram illustrating a process of taking location information into consideration when UE according to an embodiment is set in small data management mode.

FIG. 11 is a diagram illustrating that an example in which an MME 1103 determines whether or not to apply SDM mode depending on the mobility of UE 1101 and configures SDM mode is described through an Attach process according to an embodiment.

Referring to FIG. 11, the UE 1101 may send an access request message to the MME 1103 in order to access a network. The MME 1103 may receive data, including the subscription information described with reference to Table 1, from an HSS 1106. The MME 1103 may check an area in which the UE 1101 is placed, and may determine whether or not to configure the corresponding UE 1101 in SDM mode based on the received subscription information. The MME 1103 transfers information indicative that the UE is in SDM mode to an eNB 1102. After performing a mode configuration, the eNB 1102 transfers configuration information to the UE 1101.

More specifically, at operation 1110, the UE 1101 may send an Attach Request message to the eNB 1102.

At operation 1115, the eNB 1102 may transfer the received Attach Request message to the MME 1103.

At operation 1120, the MME 1103 may send an Update Location Request message to the HSS 1106 based on the received Attach Request message.

At operation 1125, the HSS 106 may send an Update Location Ack to the MME 1103 based on the received Update Location Request. The Update Location Ack may include one or more of an indicator indicative that the UE 1101 is UE in which SDM mode needs to be configured and information related to a small data area in which it is easy to apply SDM mode to the UE. More specifically, the small data area may be included in subscription data, and the subscription data may be transferred from the HSS 1106 to the MME 1103.

At operation 1130, the MME 1103 may establish the PDN connection of the UE 1101 by performing session creation with a PGW 1105.

At operation 1135, the MME 1103 may check whether or not the area where the UE 1101 is placed and that has been received through the Attach Request message is included in the 'small data area' of the subscription data received from the HSS 1106. If the area where the UE 1101 is placed is included in the 'small data area', the MME 1103 configures the UE 1101 in SDM mode. If the area where the UE 1101 is placed is not included in the 'small data area', the MME 1103 may perform a normal Attach process. Alternatively, the MME 1103 may check information about the mobility of the UE 1101 through 'UE mobility' within the subscription data. If the UE 1101 has speed/mobility of a specific reference or lower, the MME 1103 configures the UE 1101 in SDM mode. If the UE 1101 has speed/mobility of a specific reference or higher, the MME 1103 performs a normal Attach process. The specific reference may be a value set by a service provider, or may be included in the subscription information.

Subsequent processes may be performed like the processes subsequent to operation 340 of FIG. 3.

Figure 12:
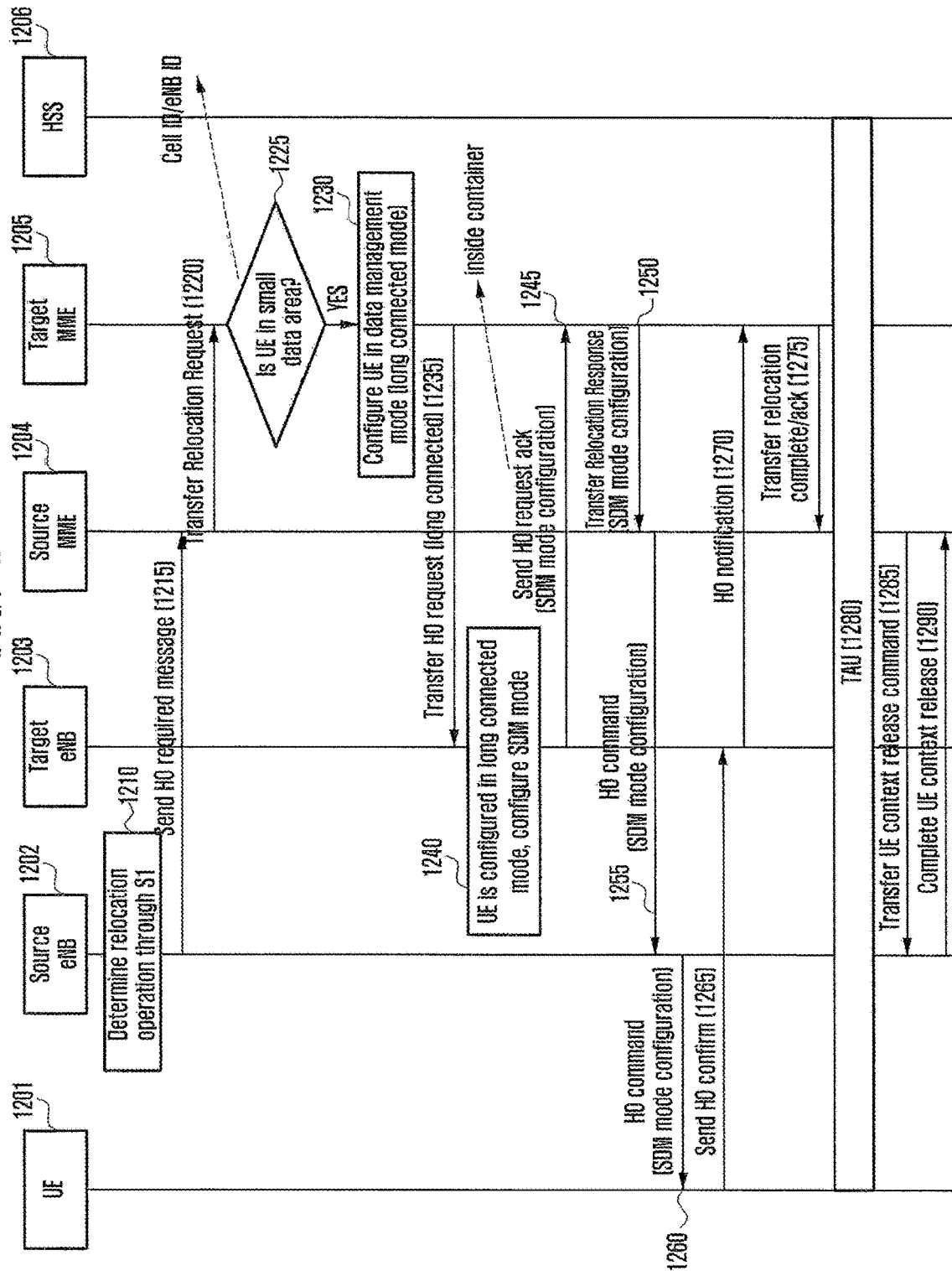
FIG. 12 is a diagram illustrating that UE according to another embodiment is set in small data management mode.

FIG. 12 is a diagram illustrating that an example in which an MME determines whether or not to apply SDM mode depending on the mobility of UE and configures SDM mode is described through an S1-based handover process according to an embodiment.

If handover conditions are satisfied, a source eNB 1202 transfers a handover request to an MME. The MME has received the subscription information, described with reference to Table 1, from an HSS through an Attach process, and has stored the received subscription information. The MME may check an area/location where UE moves, and may determine whether or not to configure the corresponding UE 1201 in SDM mode based on the subscription information. The MME may transfer information indicative that the UE 1201 is in SDM mode to target eNB. After performing a mode configuration, a target eNB transfers configuration information to the UE.

The embodiment of FIG. 12 has illustrated only the case of handover in which the MME is changed, but omitted a process with an SGW.

At operation 1210, the source eNB 1202 may determine to start relocation through S1. At operation 1215, the source eNB 1202 may send an HO required message to the source MME 1204. The source eNB 1202 may notify the source MME 1204 that the UE 1201 requires handover through the HO required message.

At operation 1220, the source MME 1204 may transfer a forward relocation request message to a target MME 1205 in order to perform the handover based on the message received at operation 1215. The forward relocation request message may include information about the location where the UE 1201 is not placed.

At operation 1225, the target MME 1205 may check whether or not the area where the UE 1201 is placed and that has been received from the source MME 1204 at operation 1220 is included in a 'small data area' within the subscription data. If the area where the UE 1201 is placed is included in the 'small data area', the target MME 1205 configures the UE 1201 in SDM mode. If the area where the UE 1201 is placed is not included in the 'small data area', the target MME 1205 may perform a normal handover process. Alternatively, the target MME 1205 may determine whether or not to configure SDM mode through 'UE mobility' within the subscription data. This is the same as the reference of the embodiment described with reference to FIG. 11.

At operation 1230, the target MME 1205 may determine to configure the UE 1201 in SDM mode based on a result of the determination at operation 1225.

At operation 1235, the target MME 1205 may transfer a message, including information indicative that the UE 1201 has been configured in SDM mode, to a target eNB 1203.

At operation 1240, the target eNB 1203 may perform an SDM mode configuration.

At operation 1245, the target eNB 1203 may notify the target MME 1205 that the UE 1201 has been configured in SDM mode through an HO request ack message. The HO request ack message may include information about the mode configuration of the target eNB 1203.

At operation 1250, the target MME 1205 may send a forward relocation response message to the source MME 1204. The forward relocation response message may include mode configuration information received at operation 1245.

At operation 1255, the source MME 1204 may transfer an HO command message to the source eNB 1202. The HO command message may include the mode configuration information received at operation 1250.

At operation 1260, the source eNB 1202 may transfer the HO command message to the UE 1201. The HO command message may include the mode configuration information received at operation 1255.

Subsequent processes may be performed like the aforementioned handover processes.

It is to be noted that additional processes may be required for the attachment and handover of the UE in addition to the processes marked in FIGS. 2 to 4, 11, and 12. Furthermore, it is to be noted that different messages may be used other than the messages proposed in the drawings or different parameters may be used.

A method of performing a mode configuration according to an embodiment is described below with reference to FIG. 2.

The mode configuration includes that a network performs the internal configurations of network entities in order to set UE in SDM mode or connected mode and controls a configuration value transferred to the UE.

In an embodiment, the eNB 102 may perform a mode configuration by setting an SDM inactivity timer and/or setting a measurement configuration value and/or setting the DRX value of UE.

First, although ongoing data is not present, the eNB 102 may maintain a Small Data Management (SDM) inactivity timer in order to maintain the UE 100 in connected mode. The SDM inactivity timer may be a value changed from the value of an existing inactivity timer, or may be a parameter that has been newly generated for SDM mode.

The SDM inactivity timer is indicative of the time when the eNB 102 maintains the UE 100 of SDM mode in connected mode. The UE 100 may remain in connected mode regardless of whether data has been transmitted or not until the SDM inactivity timer expires. That is, the eNB 102 does not perform S1 release, that is, network resources between the eNB 102 and the MME 108.

In general, if the eNB wants to lengthily maintain the UE in connected mode as proposed by the present disclosure, the SDM inactivity timer may be set to be longer than that in connected mode. In general, if an existing inactivity timer is used as the SDM inactivity timer, the value of the existing inactivity timer may be set to be longer than that in connected mode.

The SDM inactivity timer proposed by the present disclosure is a pre-configured value that is identically set for the UE 100 in SDM mode, or includes a value that is differently set by the eNB 102 according to each UE depending on network conditions.

The eNB sets a DRX value transferred to the UE. In accordance with an embodiment, the eNB separately has a DRX value for UE in SDM mode. In accordance with another embodiment, the DRX value may be received from the MME. In accordance with the DRX value, in general, the DRX value of UE in SDM mode may be set to be longer than that in connected mode. For example, UE in SDM mode may use a DRX value that is used in idle mode although the UE is in connected mode.

The eNB 102 sets a measurement configuration value transferred to the UE. In accordance with an embodiment, the eNB 102 separately has a measurement configuration value for UE in SDM mode. In accordance with the measurement configuration, for example, the interval at which the UE 100 sends a measurement report may be longer than that in existing connected mode, or a threshold value at which the UE 100 sends a measurement report may be smaller than that in existing connected mode.

The measurement configuration may include a new parameter value or the value of an existing parameter within a MeasConfig IE within an RRCConnectionreconfiguration message in a modified form.

The value of the measurement configuration may be a value previously set by a service provider, or may be a value that is variably set by the eNB 102 according to the network state. Furthermore, the value of the measurement configuration may be identically set in all the eNBs 102 within the network, or may be differently set in each eNB 102. Furthermore, the value of the measurement configuration may be identically applied to all pieces of UE in SDM mode, or may be differently set and applied to each piece of the UE 100.

A mode change is described below with reference to FIG. 1.

First, a process of a change from SDM mode to connected mode is described below.

If the UE 100 in SDM mode sends normal data or the UE 100 receives the normal data, a network may change mode of the UE 100 into connected mode.

An embodiment of the present disclosure proposes the following method as a method of performing a mode change.

1. First, a mode change may be performed using a message related to bearer resources requested by the UE 100, or
2. the network may detect normal data based on one or more of type and form of data transmitted and received by the UE 100. A mode change may be performed based on the detection, or
3. a mode change may be performed when the UE deviates from a 'small data area' within subscription data.

1. A method of performing a mode change using a message related to bearer resources requested by the UE 100 is described below. If the UE 100 wants to send normal data, the UE 100 uses a process or method defined in an existing standard. In brief, the UE sends a message that requests required bearer resources to the PGW 106 over a network.

The PGW 106 that has received the message requesting the bearer resources may instruct a new dedicated bearer to be generated if it is unable to provide the bearer resources requested by the UE 100 due to the modification of an existing bearer. Furthermore, if the bearer resources requested by the UE 100 can be provided due to the modification of an existing bearer, the PGW 106 may instruct the resources of the existing bearer to be modified and used.

In an embodiment, information for changing mode of the UE 100 into connected mode may be obtained from a message that instructs a new bearer to be generated, or may be obtained from a parameter proposed by an embodiment in which the necessity of a mode change is indicative by a message that instructs an existing bearer to be modified and used. The contents in which information for changing mode of the UE 100 into connected mode is obtained from a message that instructs a new bearer to be generated are described with reference to FIGS. 5A and 5B. Furthermore, the contents in which the necessity of a mode change is indicative by a message that instructs an existing bearer to be modified and used are described with reference to FIGS. 6A and 6B.

Figure 5A:
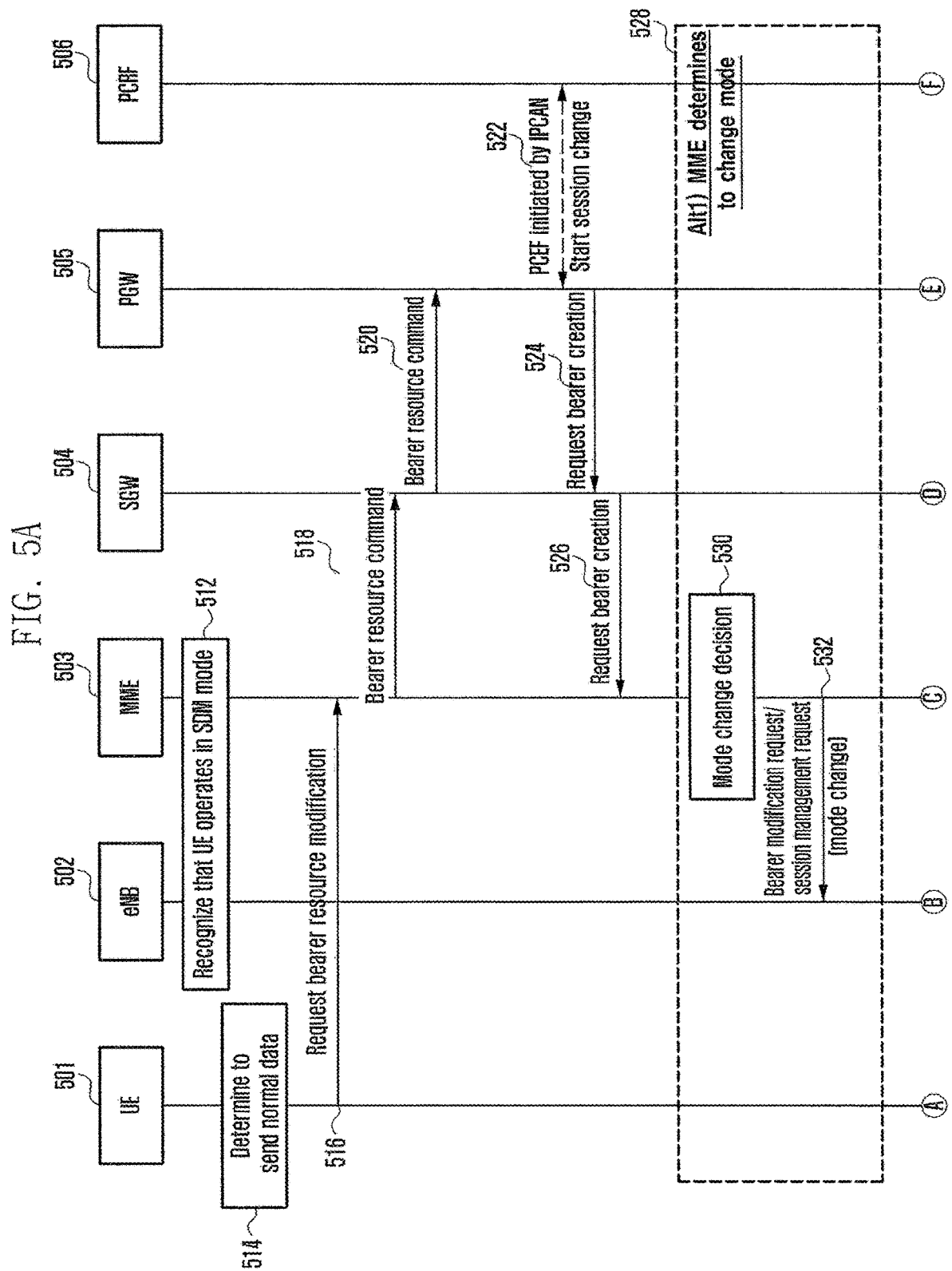
FIGS. 5A and 5B are diagrams illustrating that an MME or eNB according to an embodiment performs a change from small data management mode to connected mode.
Figure 5B:
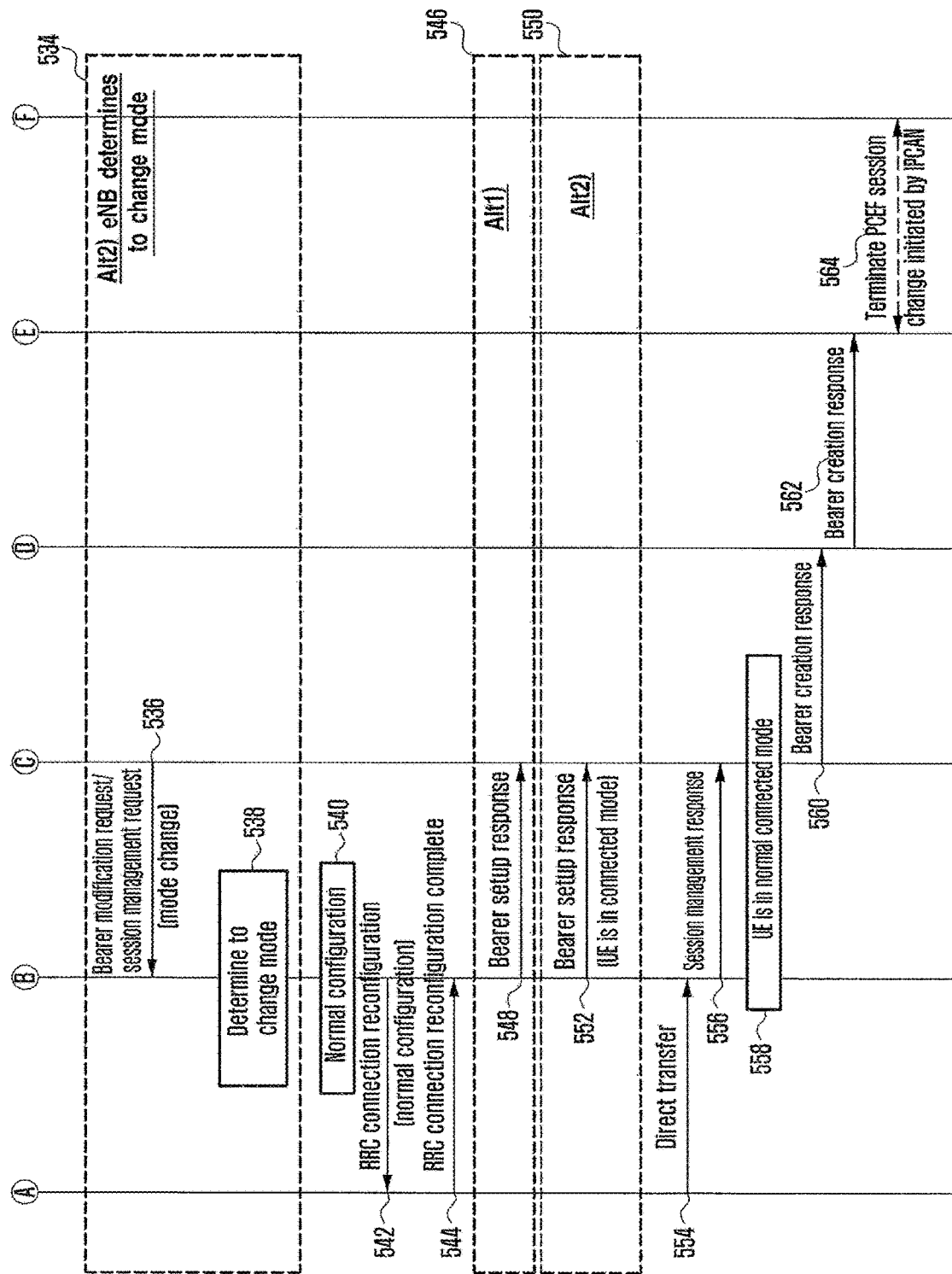

FIGS. 5A and 5B are diagrams illustrating that an MME or an eNB obtains mode change information from a message that instructs a new bearer to be generated (from a PGW) and performs a change from SDM mode to connected mode.

Referring to FIGS. 5A and 5B, in an embodiment, an MME 503 or an eNB 502 may determine whether UE 501 requests normal data or the UE 501 is using small data based on the number of bearers of the UE 501.

A mode decision may be made by the MME 503 or the eNB 502. If the MME 503 makes a mode decision, Alt1 methods 528 and 546 may be used. If the eNB 502 makes a mode decision, Alt2 methods 534 and 550 may be used.

In an embodiment, it is assumed that the eNB 502 and the MME 503 already know that the corresponding UE 501 is in SDM mode (operation 512).

At operation 514, the UE 501 determines to send normal data

At operation 516, the UE 501 may send a Request Bearer Resource Modification message to the MME 503.

At operation 518 to operation 526, the MME 503 transfers a request, including the Request Bearer Resource Modification message received at operation 516, to a PGW 505. The PGW 505 may generate a new bearer based on data communication with a PCRF 506 and the request from the UE 501, and may notify the MME 503 of the generated new nearer through a Create Bearer Request. A process of generating the bearer complies with a standard process.

Alt1) 528, at operation 530, the MME 503 that has received the Create Bearer Request determines that the UE 501 wants to send the normal data based on the request of the new bearer from the UE 501 in SDM mode. The MME 503 that has determines that the UE 501 sends the normal data determines to configure the UE in connected mode.

At operation 532, the MME 503 notifies the eNB 502 that the UE 501 has been configured in connected mode. At operation 532, information that is used for the MME 503 to provide the notification to the eNB 502 may be included in a Bearer setup Request/Session management request message as a new parameter, or the MME 503 may notify the eNB 502 that the UE 501 has been configured in connected mode by changing a value within an existing parameter. A mode change illustrated in FIG. 5 may include both the aforementioned two methods.

Alt2) 534, at operation 536, the MME 503 sends a Bearer setup Request/Session management request message to the eNB 502 according to an existing standard process.

At operation 538, the eNB 502 that has received the message determines that the UE 501 wants to send the normal data based on the request of the new bearer from the UE 501 in SDM mode. The eNB 502 that has determined that the UE 501 sends the normal data determines to configure the UE in connected mode.

At operation 540, the eNB 502 may perform a connected mode configuration based on the received or determined mode change information. The process may include a normal configuration.

At operation 542, the eNB 502 sends information, including information about mode configured at operation 540, to the UE 501 through an RRC connection reconfiguration message.

At operation 548 to operation 564, the UE 501 performs the remaining bearer creation process.

This requires an additional process in which the eNB 502 notifies the MME 503 that the UE 501 changes into connected mode only in the case of an Alt2 550 in an existing standard process (operation 552).

In the process of providing the notification to the MME 503, information indicative that the UE 501 has changed into connected mode may be included as a new parameter within a Bearer setup response message, or is possible by changing a value within an existing parameter. The UE in connected mode indicated in FIGS. 5A and 5B refers to both the aforementioned two methods. Subsequent bearer creation processes may comply with an existing standard process.

Figure 6B:
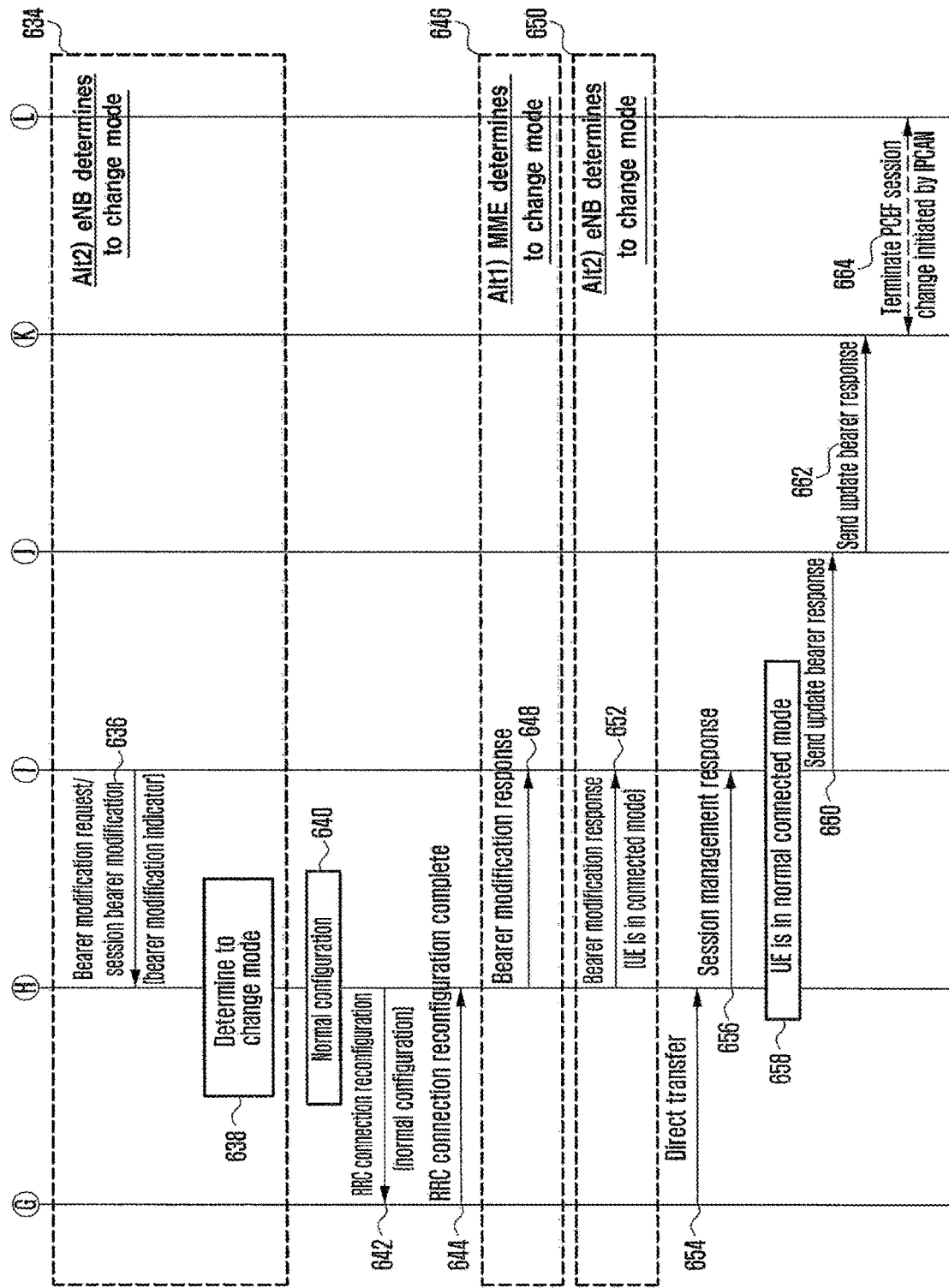

FIGS. 6A and 6B are diagrams illustrating that an MME 603 or an eNB 602 obtains mode change information from a message that has been transmitted by a PGW 605 and that instructs a change of an existing bearer and performs a change from SDM mode to connected mode.

Referring to FIGS. 6A and 6B, a mode decision may be made by the MME 603 or the eNB 602. If the MME 603 makes a mode decision, Alt1 methods 628 and 646 of FIGS. 6A and 6B are used. If the eNB 602 makes a mode decision, Alt2 methods 634 and 650 of FIGS. 6A and 6B are used.

In the case of the methods described in FIGS. 6A and 6B, the MME 603 or the eNB 602 may receive additional information from the PGW 605 according to an embodiment of the present disclosure because it is unable to know whether UE 601 requests normal data or the UE 601 is using small data based on the number of bearers, and may determine a mode change.

The difference between FIGS. 5 and 6 is that an Update Bearer Request message initiated at operation 624 is used because an existing bearer is modified in order to send and receive normal data and the MME 603 or the eNB 602 receives additional information indicative that a bearer has been modified from the PGW 605 in order to send and receive normal data.

The additional information may be included in the Update Bearer Request message as a new parameter at operation 624, or is possible by changing a value within an existing parameter.

A bearer modification indicator refers to both the aforementioned two methods indicated in FIG. 6.

In an embodiment, it is assumed that the eNB 602 and the MME 603 already know that the corresponding UE 601 is in SDM mode (operation 612).

At operation 614, the UE 601 determines to send normal data

At operation 616, the UE 601 may send a Request Bearer Resource Modification message to the MME 603.

At operation 618 to operation 626, the MME 603 transfers a request, including the Request Bearer Resource Modification message received at operation 616, to the PGW 605. The PGW 605 may generate a new bearer based on data communication with a PCRF 606 and the request from the UE 601, and may notify the MME 603 of the generated new bearer through a Create Bearer Request. A process of generating the bearer complies with a standard process.

Alt1) 628, at operation 630, the MME 603 that has received the Create Bearer Request including a bearer modification indicator determines that the UE 601 wants to send the normal data based on the request of the new bearer from the UE 601 in SDM mode. The MME 603 that has determined that the UE 601 wants to send the normal data determines to configure the UE in connected mode.

At operation 632, the MME 603 notifies the eNB 602 that the UE 601 has been configured in connected mode. At operation 632, information used for the MME 603 to provide the notification to the eNB 602 may be included in a Bearer setup Request/Session management request message as a new parameter, or the MME 603 may notify the eNB 602 that the UE 601 has been configured in connected mode by changing a value within an existing parameter. A mode change indicated in FIGS. 6A and 6B may include both the aforementioned two methods.

Alt2) 634, at operation 636, the MME 603 sends the Bearer setup Request/Session management request message to the eNB 602 according to an existing standard process.

At operation 638, the eNB 602 that has received the message determines that the UE 601 wants to send the normal data based on the request of the new bearer from the UE 601 in SDM mode. The eNB 602 that has determined that the UE 601 wants to send the normal data determines to configure the UE in connected mode.

At operation 640, the eNB 602 may perform a connected mode configuration based on the received or determined mode change information. The process may include a normal configuration.

At operation 642, the eNB 602 sends information, including information about mode configured at operation 640, to the UE 601 through an RRC connection reconfiguration message. At operation 648 to operation 664, the UE 601 performs the remaining bearer modification processes.

This requires an additional process of notifying, by the eNB 602, the MME 603 that the UE 601 has changed into connected mode only in the case of the Alt2 method 650 in an existing standard process.

In the process of providing the notification to the MME 603, information indicative that the UE 601 has changed into connected mode may be included in a bearer setup response message as a new parameter, or is possible by changing a value within an existing parameter. The UE in connected mode indicated in FIGS. 6A and 6B refers to both the aforementioned two methods. Subsequent bearer modification processes may comply with an existing standard process.

2. A technology in which a network detects the transmission of normal data based on the type or form of data transmitted and received by the UE 100 is described below. In accordance with the present disclosure, if the UE 100 wants to send normal data, the UE sends the normal data through an already included default bearer. After a specific time, the PGW 106 or a Traffic Detection Function (TDF) detects that the corresponding data is the normal data. In other words, the PGW 106 or the TDF detects that the corresponding data is not small data. In the present disclosure, a method of detecting, by the PGW 106 or the TDF, small data is described. The detection of normal data becomes aware by detecting that corresponding data is not small data. The specific time during which the PGW 106 or the TDF detects that corresponding data is not small data (i.e., the corresponding data is normal data) may comply with a service provider policy, or may be selectively set depending on network conditions.

A method of detecting, by the PGW 106 or the TDF, small data basically includes two methods.

The first method is to use a De-Packet Inspection (DPI) function, and the second method is to use a packet filter.

The first method using the DPI function is described below.

1) The method of detecting, by the PGW 106, small data using the DPI function may include the following operations.

The PGW 106 receives an Application Detection Control (ADC) rule for detecting small data from the PCRF and installs the received ADC rule. Alternatively, the PGW 106 may detect small data according to a pre-configured rule.

In an embodiment, the PGW 106 detects small data according to a rule using the DPI function.

2) The method of detecting, by the TDF, small data using the DPI function may include the following operations.

The TDF 106 receives the ADC rule for detecting small data from the PCRF and installs the received ADC rule. Alternatively, the TDF 106 may detect small data according to a rule pre-configured in the TDF. If small data is detected through the TDF, the TDF transfers the results of the detection to the PCRF, and the PGW 106 receives detection information from the PCRF.

A method of receiving, by the PGW 106, the detection information from the PCRF may include a pull method of asking, by the PGW 106, the PCRF or a push method of transferring, by the PCRF, a request to the PGW 106.

The second method using a packet filter is described below.

A specific entity or a PCRF within a service provider network may configure a packet filter for detecting small data using an application server address and port information with which an application server outside the service provider network has been registered. The PCRF may configure the packet filter in an ADC rule form, and may transfer the configured ADC rule to the PGW 106 or the TDF. The PGW 106 or the TDF installs the received ADC rule. Alternatively, the PCRF may transfer the packet filter to the PGW or the TDF. Alternatively, the packet filter received by the PGW may be transferred to the SGW. The SGW may detect small data using the received packet filter.

The PGW 106 may transfer information, detected using the method, to the MME 108 or the eNB 102. The information may be used to change the UE 100 into connected mode.

3. A technology for performing a mode change when UE deviates from a 'small data area' within subscription data is described below.

If UE performs handover, an MME checks whether the location to which the UE moves is included in a 'small data area'. If the location to which the UE moves is not included in the small data area, the MME may change the UE into connected mode.

FIG. 7 is a diagram illustrating that a PGW transfers mode change information to an MME 703 or an eNB 702 using a new message proposed by the present disclosure.

Referring to FIG. 7, a mode decision may be made by the MME 703 or the eNB 702. If the MME 703 makes a mode decision, Alt1 methods 728 and 746 of FIG. 7 are used. If the eNB 702 makes a mode decision, Alt2 methods 734 and 750 of FIG. 7 are used.

At operation 712, the eNB 702 and the MME 703 already know that corresponding UE 701 is in SDM mode.

At operation 714, the UE 701 determines to send normal data

At operation 716, the UE 701 sends the normal data through a default bearer.

At operation 718, the PGW 705 detects the normal data transmitted by the UE 701.

At operation 720, the PGW 705 may notify an SGW 704 that the UE 701 has started sending and receiving the normal data through Notify normal data, that is, a GTP-C message proposed by an embodiment.

At operation 722, the SGW 704 may send the received Notify normal data to the MME 703.

At operation 724, the MME 703 may send a Notify normal data ack indicative that the successful reception of the Notify normal data to the SGW 704. At operation 726, the SGW 704 may send the Notify normal data ack to a PGW 705.

Alt1) 728, at operation 730, the MME 703 that has received the request may determine to configure the UE in connected mode.

At operation 732, the MME 703 may notify the eNB 702 that the UE 701 has been configured in connected mode through a Notify normal data message, that is, an S1-AP message proposed by an embodiment.

Alt2) 734, at operation 736, the MME 703 sends a Mode change request message, that is, an S1-AP message proposed by an embodiment, to the eNB 702.

At operation 738, the eNB 702 may determine to configure the UE 701 in connected mode based on the received Mode change request message.

At operation 740, the eNB 702 may perform a connected mode configuration based on the received mode change information.

At operation 742, the eNB 702 may send information about mode configured at operation 740 to the UE 701 through an RRC connection reconfiguration message.

At operation 744, the UE 701 that has received the RRC connection reconfiguration message may send an RRC connection reconfiguration complete message to the eNB 702.

Alt1) 746, at operation 748, the eNB 702 may send a Mode change response message, that is, an S1-AP message proposed by an embodiment, to the MME 703.

Alt2) 750, at operation 752, the eNB 702 may send a Notify normal data ack message, that is, an S1-AP message proposed by an embodiment, to the MME 703.

In addition to the S1-AP message used in FIG. 7, an existing S1-AP message may also be used to transfer mode change information.

Figure 8:
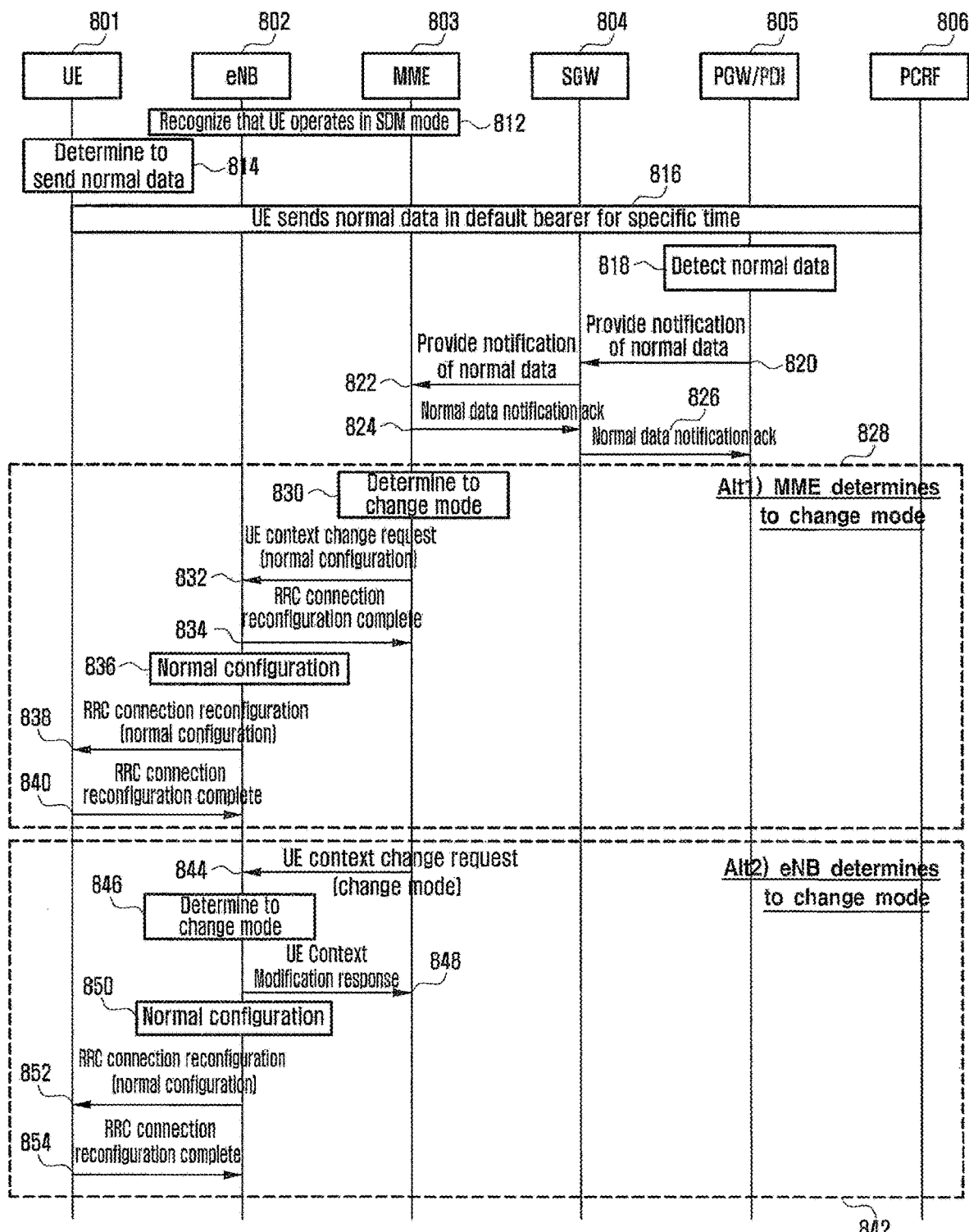
FIG. 8 is a diagram illustrating the case where a UE Context Modification Request message is used according to an embodiment.

FIG. 8 is a diagram illustrating the case where the UE Context Modification Request message, that is, the aforementioned existing S1-AP message, is used.

Referring to FIG. 8, an MME 803 may include mode change information in a UE Context Modification Request message, that is, an S1-AP message, instead of Notify normal data, and may send the UE Context Modification Request message to an eNB 802. The information may be included in the UE Context Modification Request message as a new parameter, or is possible by changing a value within an existing parameter.

A process of performing a change into connected mode, SDM mode, or idle mode is described below with reference to FIG. 1.

In accordance with an embodiment, the UE 100 that has completed the transmission of normal data may shift to SDM mode, and the UE 100 may shift to idle mode. Whether the UE 100 shifts to SDM mode or idle mode may be selectively determined by the configuration of a service provider.

A method of performing, by the UE 100, a mode change into SDM mode is similar to those described with reference to FIGS. 5A, 5B, 6A, 6B, 7, and 8. A network may detect SDM mode using a message related to bearer resources requested by the UE 100 or through the type/form of data transmitted and received by the UE 100.

First, a method using the message related to bearer resources requested by the UE 100 is described below. If the UE 100 completes the transmission of normal data, the UE 100 uses a process/method defined in an existing standard. The UE 100 sends a message that requests bearer resources for the PGW 106 to a network.

In such a case, the bearer resources requested from the PGW 106 by the UE 100 have a value smaller than an existing value. The PGW 106 that has received the message may modify an existing bearer into the bearer resources requested by the UE 100, or may instruct that a dedicated bearer used to send the normal data be deleted.

In an embodiment, information for changing the UE 100 into SDM mode may be obtained from a message instructing that a dedicated bearer be deleted, or may be obtained from a parameter proposed by an embodiment in which the necessity of a mode change is indicative in a message that instructs an existing bearer be modified and used.

The aforementioned method is applied like the processes described with reference to FIGS. 5A, 5B, 6A, and 6B. The difference is that if information for changing the UE 100 into SDM mode is obtained from the message instructing that a dedicated bearer be deleted, the PGW 106 sends a Delete Bearer Request to the MME 108. Furthermore, the eNB 102 configures SDM mode.

The case where a network detects SDM mode through the type/form of data transmitted and received by the UE 100 is described below. If the UE 100 completes the transmission of normal data, the PGW 106 detects that the UE 100 has completed the transmission and reception of the normal data. The detection is possible through the PGW 106 or the TDF. The detection may mean the case where the PGW or the TDF detects small data or the case where no data transmission and reception has been detected. The PGW 106 transfers such information to the MME 108 or the eNB 102, and the information may be used to change the UE into SDM mode.

Figure 9:
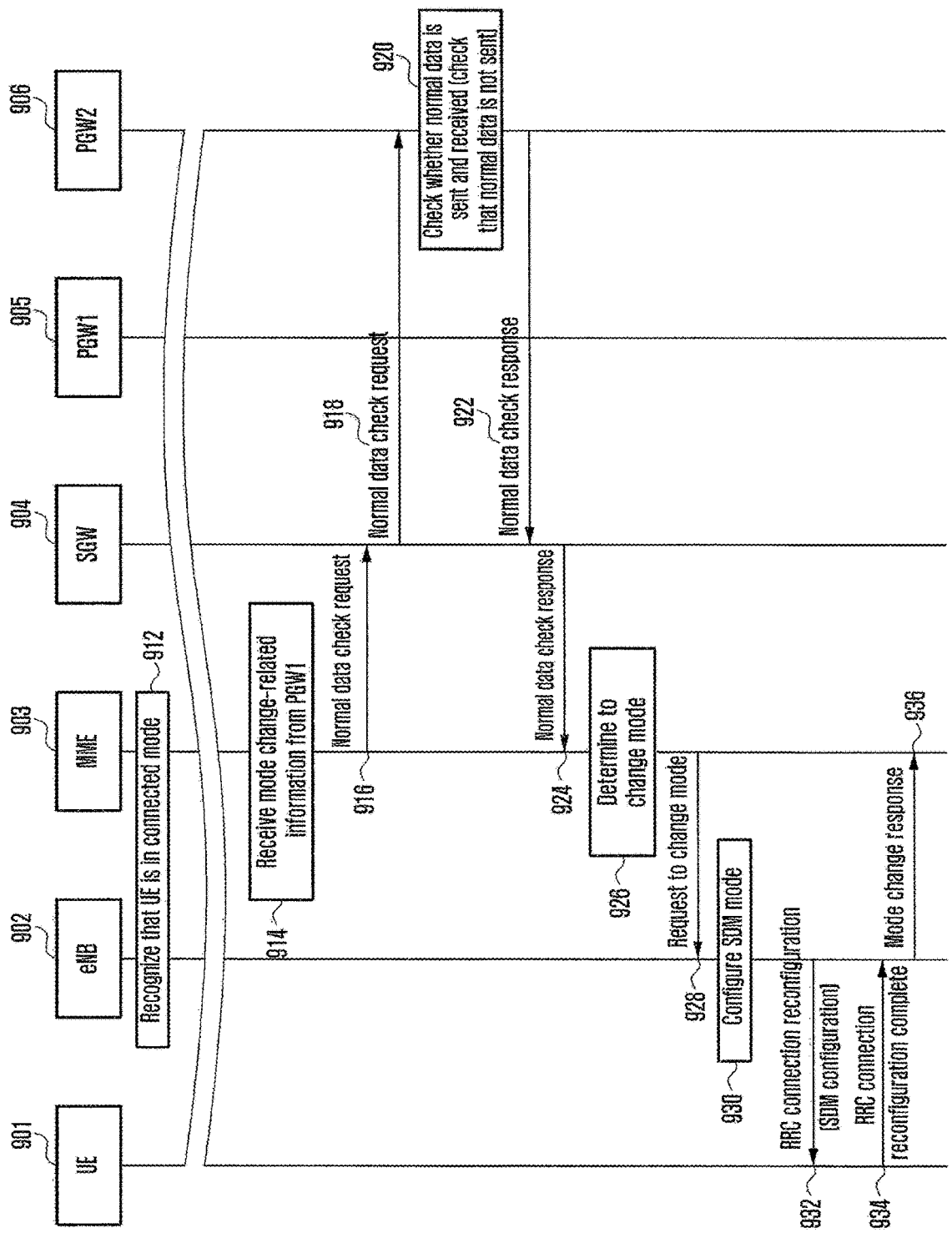
FIG. 9 is a diagram illustrating a process of transmitting and receiving data between a PGW1, a PGW2, an MME, and UE according to an embodiment of the present disclosure.

If the UE 100 includes a plurality of PDN connections with a plurality of the PGWs 106, the transmission of normal data in a single PDN connection has been terminated, but the transmission and reception of normal data in other PDN connections may be in progress. That is, the MME 108 and the eNB 102 need to check whether mode is SDM mode in all the PDN connections of the UE 100. FIG. 9 is a diagram illustrating a process of asking, by an MME 903, the PGW2 906 to check whether corresponding UE is sending and receiving normal data when the MME 903 receives information about the mode change of UE 901 from the PGW1 905 with respect to the UE 901 having two PDN connections with a PGW1 905 and a PGW2 906 according to an embodiment.

Referring to FIG. 9, at operation 912, an eNB 902 and the MME 903 already know that the UE 901 is in connected mode.

At operation 914, the MME 903 may receive information about a mode change from the PGW1 905.

At operation 916 and operation 918, the MME 903 may check that the UE 901 has PDN connections with the PGW2 906 in addition to the PGW1 905, and may check whether the UE 901 is sending and receiving normal data by sending a Normal Data Check Request message, that is, a GTP-C message according to an embodiment, to the PGW2 906.

At operation 920, the PGW2 906 checks whether normal data is transmitted and receiving. As described above, the detection is possible through the TDF for detecting packets transmitted and received by the PGW2 906 or the PGW2 906.

At operation 922 and operation 924, the PGW2 906 provides notification that the UE 901 is not sending and receiving normal data by sending a Normal Data Check Response message, that is, a GTP-C message according to an embodiment.

At operation 926, the MME 903 may determine a mode change based on the information received at operation 924.

At operation 928, the MME 903 may notify the eNB 902 of a mode change by sending a Mode Change Request, that is, an S1-AP message according to an embodiment.

At operation 930, the eNB 902 may perform a connected mode configuration based on information about the mode change received at operation 928.

At operation 932, the eNB 902 may send information about mode configured at operation 930 to the UE 901 through an RRC connection reconfiguration message.

At operation 934, the UE 901 sends an RRC connection reconfiguration complete message to the eNB 902.

At operation 936, the eNB 902 may send a Mode change response message, that is, an S1-AP message according to an embodiment, to the MME 903.

The UE 901 according to an embodiment may shift to idle mode after the transmission of the normal data is completed. If the UE 902 is in connected mode, the eNB 902 shifts the UE 902 to idle mode using an existing method of shifting the state of the UE 901. That is, an S1 bearer is released. In accordance with another embodiment, when an SDM inactivity timer or existing inactivity timer in connected mode expires, the eNB 902 may shift the UE 902 to idle mode. A timer applied when the UE 902 shifts to idle mode may be determined by a service provider.

A process of UE shifting from idle mode to SDM mode or connected mode is described below.

If the UE 100 in idle mode attempts to send and receive data, the UE 100 sends a Service Request message in order to establish radio connection and core network connection.

The transmission of the service request complies with an existing standard process. A network that has received the service request from the UE 100 configures the UE in SDM mode like in a method of determining mode of the UE 100 in the Attach process.

If the UE 100 that has sent the service request wants to send small data, the UE 100 performs data transmission in configured SDM mode. If the UE 100 wants to send normal data, the UE may shift to connected mode by additionally using the methods proposed by FIGS. 5A, 5B, 6, 7, and 8.

Figure 10:
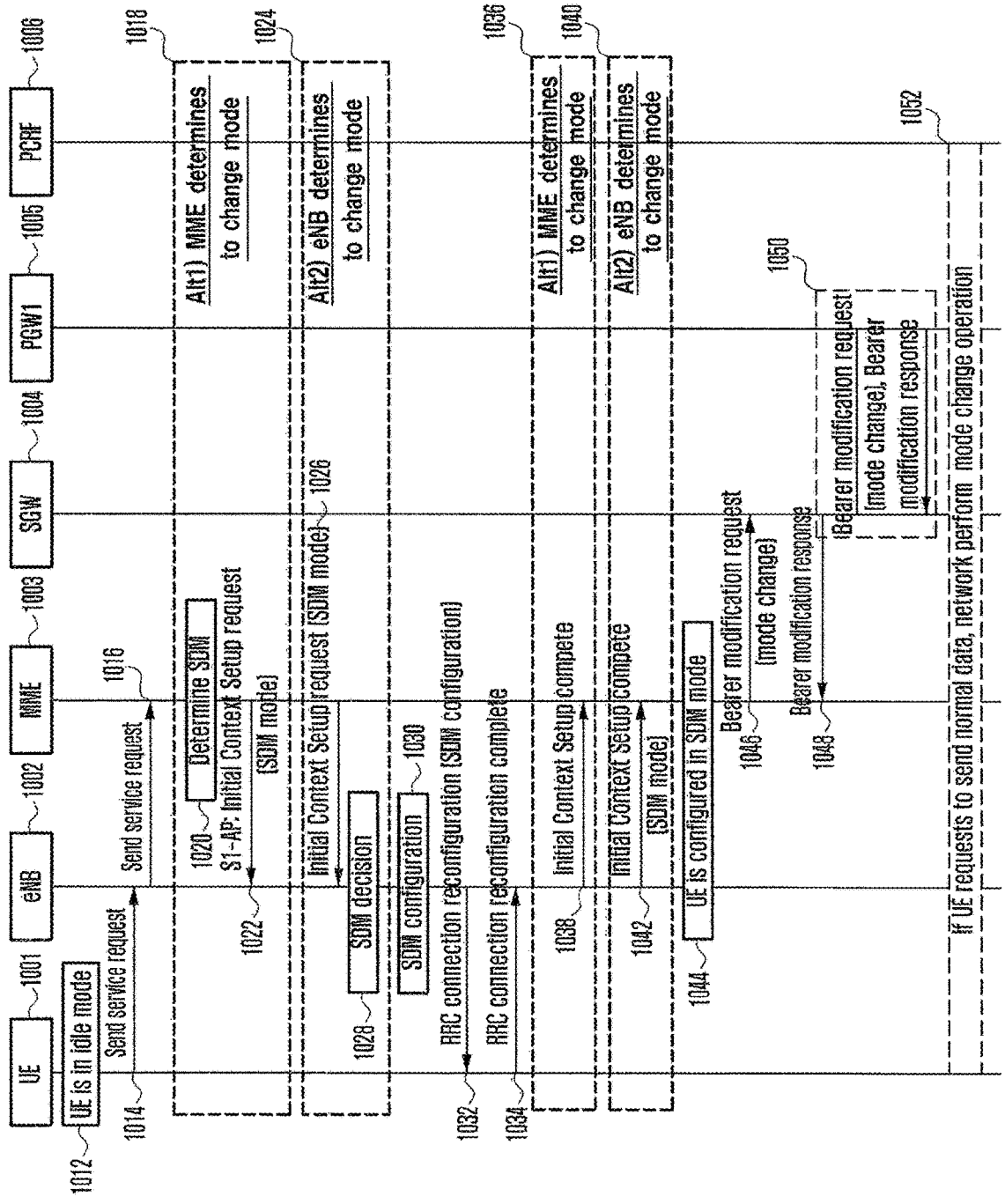
FIG. 10 is a diagram illustrating that UE according to an embodiment is set in small data management mode.

FIG. 10 is a diagram illustrating that when UE 1001 in idle mode sends a service request in order to send data, the UE 1001 is configured in SDM mode according to an embodiment.

Referring to FIG. 10, a mode decision may be made by an MME 1003 or an eNB 1002. If the MME 1003 makes a mode decision, Alt1 methods 1018 and 1036 of FIG. 10 are used. If the eNB 1002 makes a mode decision, Alt2 methods 1024 and 1040 of FIG. 10 are used.

At operation 1012, the UE 1001 is in idle mode.

At operation 1014, the UE sends a Service Request message to the eNB 1002.

At operation 1016, the eNB 1002 sends a service request to the MME 1003 based on the message received at operation 1014.

Alt1) 1018, at operation 1020, the MME determines whether or not to configure the corresponding UE in SDM mode based on UE context.

At operation 1022, the MME 1003 may notify the eNB 1002 that the UE 1001 is in SDM mode through an Initial Context Setup Request/Attach Accept message. Information that provides such notification to the eNB 1002 may be included in the Initial Context Setup Request/Attach Accept message as a new parameter, or may be included as part of the subscription data of the UE 1001. SDM mode indicative in FIG. 10 may include both the aforementioned two methods.

Alt2) 1024, at operation 1026, the MME 1003 sends the Initial Context Setup Request/Attach Accept message to the eNB 1002.

At operation 1028, the eNB 1002 determines whether or not to configure the UE 1001 in SDM mode depending on the context of the UE 1001.

At operation 1030, the eNB 1002 may perform a mode configuration based on received SDM mode information.

At operation 1032, the eNB 1002 may send information about mode configured at operation 1030 to the UE 1001 through an RRC connection reconfiguration message.

At operation 1034, the UE 1001 may send an RRC connection reconfiguration complete message to the eNB 1002 based on the received RRC connection reconfiguration message.

Alt1) 1036, at operation 1038, the eNB 1002 may send an Initial context Setup Complete message to the MME 1003.

Alt2) 1040, at operation 1042, the eNB 1002 may send the Initial context Setup Complete message, including information that provides notification that the UE 1001 has been configured in SDM mode, to the MME 1003.

At operation 1044, the configuration of the UE 1001 in SDM mode is completed in the eNB 1002 and the MME 1003.

At operation 1046, the MME 1003 may notify an SGW 1004 that a mode change has occurred in the UE 1001.

The information may be included in a Modify Bearer Request message as a new parameter, or is possible by changing a value within an existing parameter. SDM mode indicative in FIG. 10 includes both the aforementioned two methods.

At operation 1050, the SGW 1004 sends the mode change information, received at operation 1046, to a PGW 1005. The mode change information may be transmitted to the PGW 1005 through a Modify Bearer Request or a new message.

Figure 13:
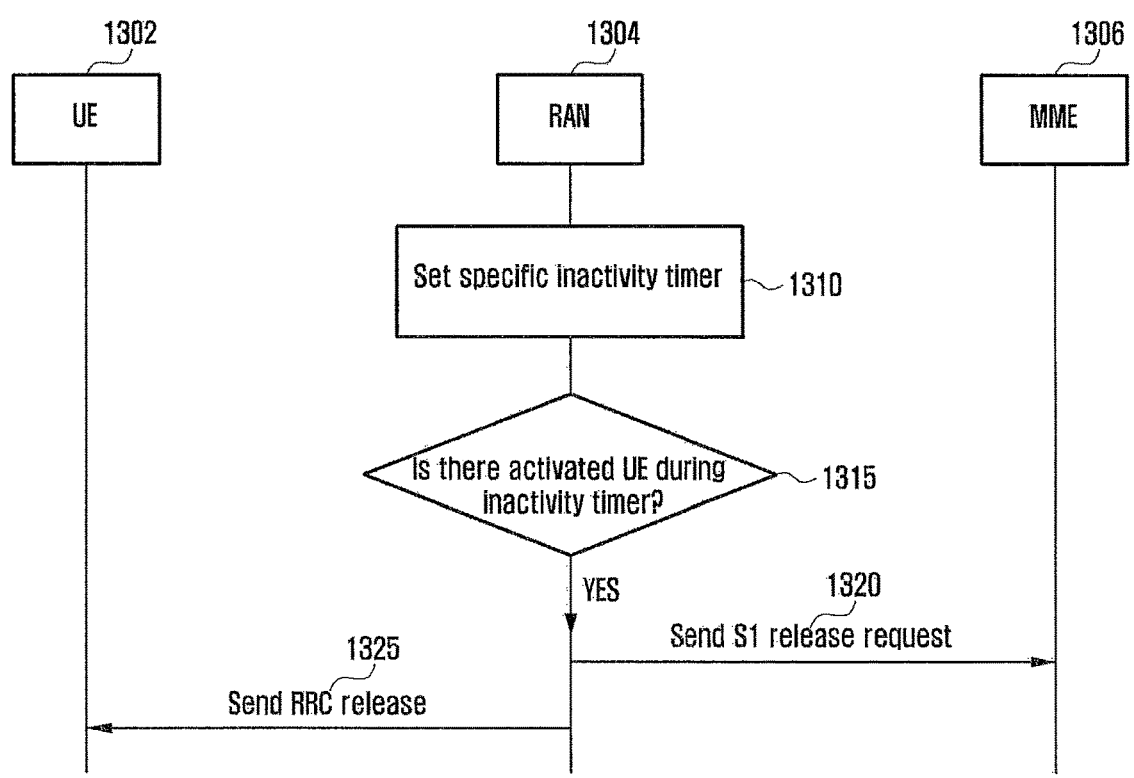
FIG. 13 is a diagram illustrating the flow of signals for controlling an RRC connection time according to an embodiment.

In the case where the PGW 1005 does not always perform detection, but performs detection only for some time or in a specific case, that is, in the case where a triggering point at which detection is started is required, if the PGW is notified of a mode change, such notification may become a triggering point at which detection is started. For this reason, an embodiment proposes a process of operation 1050. FIG. 13 is a diagram illustrating the flow of signals for controlling an RRC connection time according to an embodiment.

Referring to FIG. 13, an embodiment proposes a method for more effectively controlling an RRC connection time. In an embodiment, the transmission and reception of signals may be present between UE 1302, an RAN 1304, and an MME 1306.

At operation 1310, a node of the RAN 1304 may set the initial value of an inactivity timer by taking into consideration one or more of the characteristics of a user and the characteristics of a service application being used by the user.

At operation 1315, the node of the RAN 1304 may determine whether an operation related to the UE 1302 is not performed while the time corresponding to the initial value of the inactivity timer elapses. If an operation related to the UE 1302 is not performed while the time corresponding to the initial value of the inactivity timer elapses, the node of the RAN 1304 may release one or more of connection with a core network and connection with the UE 1302 at operation 1320 and operation 1325. If not, the node of the RAN 1304 may perform a predetermined operation.

The core network may include the MME 1306, and the release of connection with the core network may be performed using one or more of methods of deleting an S1 release request and deleting S1-AP connection.

Furthermore, the release of connection with the UE 1302 may be performed using one or more of methods of deleting RRC release and RRC connection.

In an embodiment, a method of setting, by the node of the RAN 1304, the initial value of the inactivity timer by taking into consideration one or more of the characteristics of a user and the characteristics of a service application may be performed using one or more of methods of directly receiving the initial value from the UE 1302, receiving the initial value through subscription information, and receiving the initial value determined by a PCC by taking into consideration the characteristics of traffic and a service application.

Figure 14:
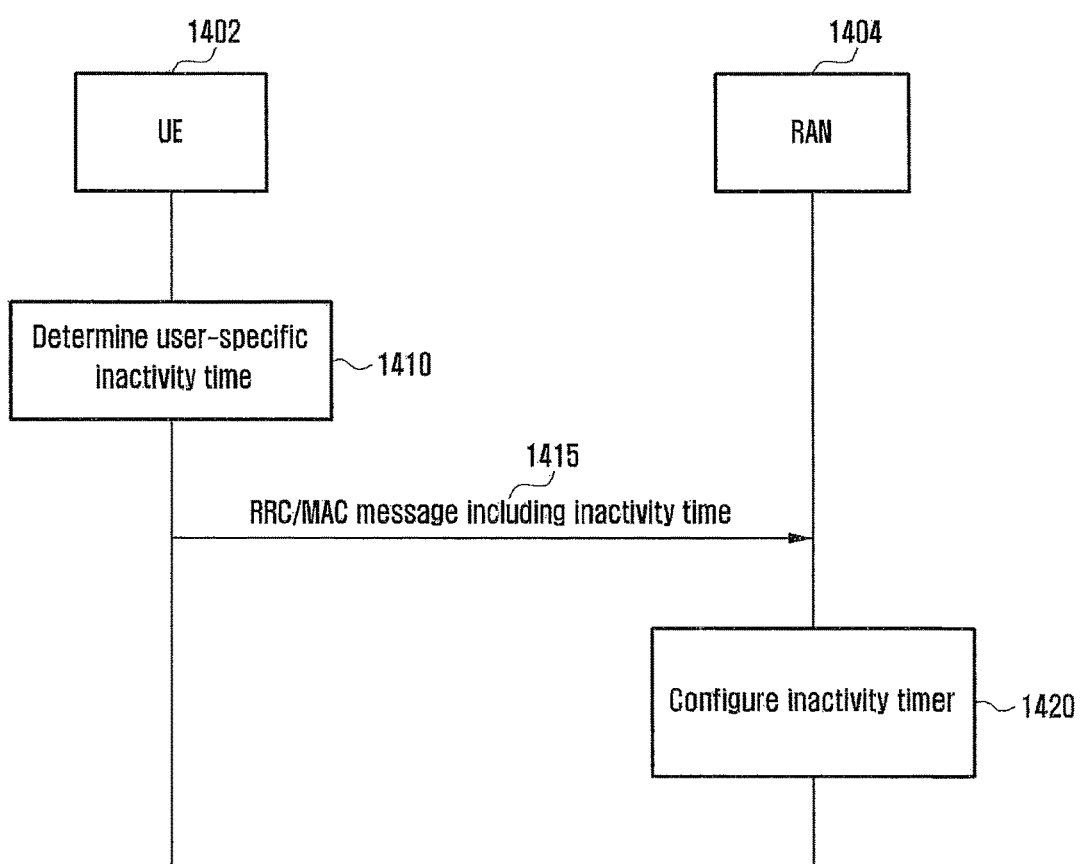
FIG. 14 is a diagram illustrating a method of setting an inactivity time between UE and the node of an RAN according to an embodiment.

FIG. 14 is a diagram illustrating a method of setting an inactivity time between UE and a node of an RAN according to an embodiment.

Referring to FIG. 14, in an embodiment, the UE 1402 may directly transfer an inactivity time to the node of the RAN 1404.

At operation 1410, the UE 1410 may determine a proper inactivity time by taking into consideration one or more of information configured in the UE 1410, preference input by the user of the UE 1410, and the characteristics of application service now being executed.

At operation 1415, the UE 1402 may send the determined inactivity time to the node of the RAN 1404. A method of transferring the determined inactivity time may be performed using a method including one or more of methods of generating RRC connection using an RRC request message, using an RRC request message that requests already established RRC connection to be modified, and using one field of a MAC Control Element (CE).

At operation 1420, the node of the RAN 1404 may set the initial value of an inactivity timer based on the inactivity time received at operation 1415. Furthermore, according to an embodiment, the operation described with reference to FIG. 13 may be performed in subsequent operations.

Figure 15:
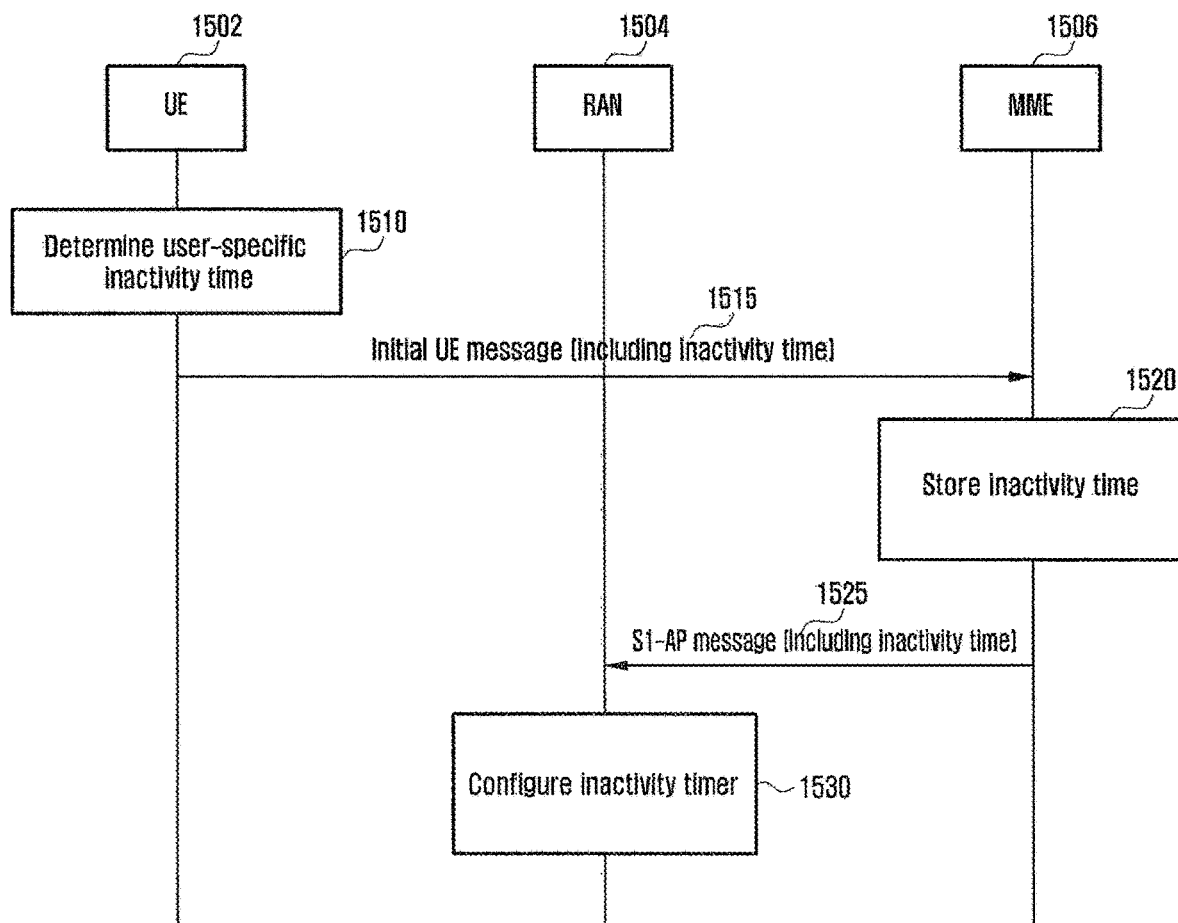
FIG. 15 is a diagram illustrating a method of setting an inactivity time between UE and a node of an RAN according to another embodiment.

FIG. 15 is a diagram illustrating a method of setting an inactivity time between UE and a node of an RAN according to another embodiment.

Referring to FIG. 15, the UE 1502 may request an inactivity time from the node of a core network. The node of the core network may configure the node of the RAN 1504 based on the request. In an embodiment, the node of the core network may include an MME 1506.

At operation 1510, the UE 1502 may determine a proper inactivity time by taking into consideration one or more of information configured in the UE 1502, preference input by a user, and the characteristics of application service now being executed.

At operation 1515, the UE 1502 may send information, including the determined inactivity time, to the node (e.g., the MME 1506) of the core network. A method of transferring the information including the determined inactivity time to the node of the core network may include transferring one or more messages of an initial NAS message, an attach request, a TAU request, and an RAU request.

At operation 1520, the node of the core network may store the inactivity time received at operation 1515. According to an embodiment, the node of the core network may store the inactivity time in the form of one of pieces of user information.

At operation 1525, the node of the core network may transfer the inactivity time to the node of the RAN 1504. According to an embodiment, when establishing connection with the UE 1502, the node of the core network may send the inactivity time to an eNB (a node of the RAN 504) using an S1-AP message (e.g., an initial context setup request). The node of the core network may include the inactivity time in the S1-AP message as one of pieces of information about the UE 1502.

At operation 1530, the node of the RAN 1504 may set the initial value of an inactivity timer for the UE 1502 based on the received inactivity time. Furthermore, according to an embodiment, the operation of FIG. 13 may be subsequently performed.

Figure 16:
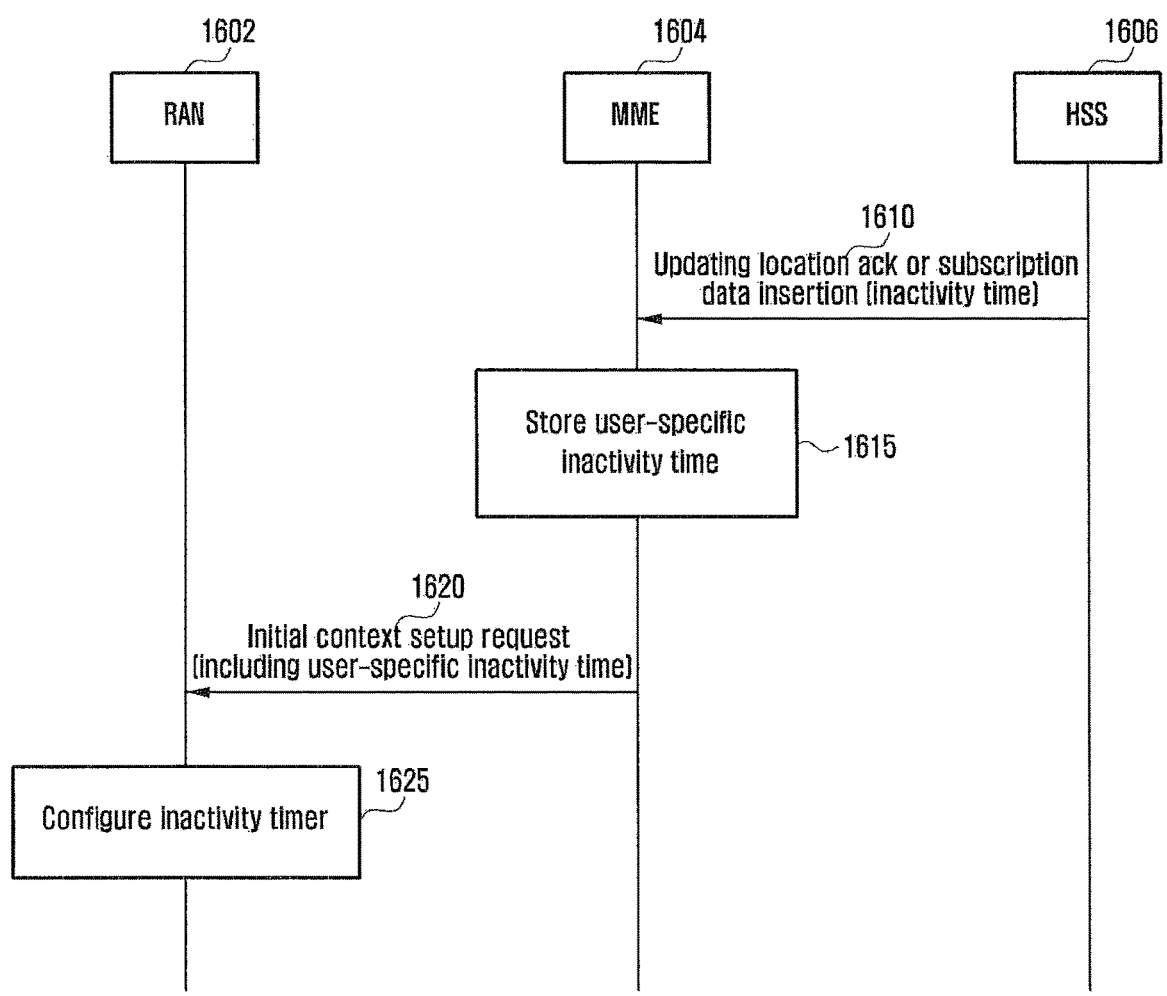
FIG. 16 is a diagram illustrating a method of setting an inactivity time between a node of a core network and a node of an RAN according to an embodiment.

FIG. 16 is a diagram illustrating a method of setting an inactivity time between a node of a core network and a node of an RAN according to an embodiment.

Referring to FIG. 16, according to an embodiment, the inactivity time of UE 1602 may be stored as one of pieces of subscription information, and may be then used.

A service provider may store the inactivity time of the UE in a subscription information database. The inactivity time of the UE may be stored as one of pieces of subscription information about the user of the UE. Furthermore, the subscription information database may include an HSS 1606.

At operation 1610, the HSS 1606 may transfer the inactivity time to the node of the core network together with the subscription information. The node of the core network may include an MME 1604.

At operation 1615, the node of the core network may store the received inactivity time.

At operation 1620, the node of the core network may transfer the inactivity time to a node of the RAN 1602. According to an embodiment, the core network may send the inactivity time to the node of the RAN 1602 when connection is established between the UE and the node of the RAN 1602. In this case, the value of the inactivity time may be stored according to each Access Point Name (APN), and may be transferred to the node of the core network according to each APN.

In an embodiment, the subscription information database (HSS) 1606 may include the inactivity time, stored as one of the pieces of subscription information, in an updating location ack message or an insert subscription data message, and may transfer the inactivity time to the node of the core network. The node (an MME 1604) of the core network may store the inactivity time, may include the stored inactivity time in an S1-AP message (e.g., an initial context setup request), and may transfer the inactivity time when connection with the UE is established. The node of the RAN 1602 that has received information including the inactivity time may set the initial value of an inactivity timer for the UE using the received inactivity time.

FIG. 17 is a diagram illustrating a method of setting an inactivity timer by taking into consideration the traffic characteristic of a service application of UE according to an embodiment.

Referring to FIG. 17, if the traffic of a variety of types of service applications is being transmitted to UE, an inactivity timer may be set by taking into consideration the traffic characteristics of the variety of types of service applications.

At operation 1710, a PCRF 1705 may determine an inactivity time by taking into consideration the characteristics of a variety of kinds of service applications of UE.

At operation 1715, the PCRF 1705 may send information, including the determined inactivity time, to a PGW 1704. According to an embodiment, the PCRF 1705 may transfer the information, including the determined inactivity time, to the PGW 1704 through PCC rule provisioning.

At operation 1720, the PGW 1704 may send the received information, including the inactivity time, to an SGW 1703. According to an embodiment, the PGW 1704 may transfer the received information, including the inactivity time, to the SGW 1703 through a GTP-c message.

At operation 1725, the SGW 1703 may send the received information, including the inactivity time, to a core network. According to an embodiment, the SGW 1703 may transfer the received information, including the inactivity time, to the core network through the GTP-c message. The core network may include an MME 1702.

In an embodiment, the value of the inactivity time may be set and transferred according to each UE, each PDN connection (or APN), and each EPS bearer.

At operation 1730, the node (MME 1702) of the core network may store the received inactivity time.

At operation 1735, the core network may send the information, including the inactivity time, to the RAN 1701. According to an embodiment, when connection with UE is established, the core network may include the stored inactivity time in an S1-AP message (e.g., an initial context setup request), and may send the inactivity time to a node of the RAN 1701.

At operation 1740, the node of the RAN 1740 may set the initial value of the inactivity timer of the UE based on the received inactivity time.

Those skilled in the art to which the present disclosure pertains will appreciate that the present disclosure may be implemented in other detailed forms without departing from the technical spirit or essential characteristics of the present disclosure. Accordingly, the aforementioned embodiments should be construed as being only illustrative, but should not be construed as being restrictive from all aspects. The scope of the present disclosure is defined by the following claims rather than the detailed description, and the meanings and scope of the claims and all changes or modified forms derived from their equivalents should be construed as falling within the scope of the present disclosure.

Meanwhile, preferred embodiments of the present disclosure disclosed in this specification and drawings and specific terms used therein are illustrated to present only specific examples in order to clarify the technical contents of the present disclosure and help understanding of the present disclosure, but are not intended to limit the scope of the present disclosure. It will be evident to those skilled in the art that various implementations based on the technical spirit of the present disclosure are possible in addition to the disclosed embodiments.

What is claimed is:

1. A method by a network entity in a communication system, the method comprising:
identifying a mobility of a terminal based on subscription information related to the terminal;
generating assistance information including information on the mobility of the terminal; and
transmitting, to a base station, a message including the assistance information,
wherein the information on the mobility of the terminal indicates whether the terminal is to be stationary or mobile, and
wherein the assistance information is used to determine a radio resource control (RRC) connection time for the terminal.

2. The method of claim 1, wherein the message includes an initial context setup request message.

3. The method of claim 1, wherein the assistance information further includes information on a state transition of the terminal identified based on the subscription information related to the terminal.

4. The method of claim 3, wherein at least one of the information on the mobility of the terminal or the information on the state transition is identified based on statistical information associated with the terminal.

5. The method of claim 3, wherein the information on the state transition of the terminal includes information on a time associated with an activity period for the terminal.

6. A method by a base station in a communication system, the method comprising:
receiving, from a network entity, a message including assistance information, the assistance information including information on a mobility of a terminal; and
identifying the mobility of the terminal based on the assistance information,
wherein the information on the mobility of the terminal is identified based on subscription information related to the terminal,
wherein the information on the mobility of the terminal indicates whether the terminal is to be stationary or mobile, and wherein the assistance information is used to determine a radio resource control (RRC) connection time for the terminal.

7. The method of claim 6, wherein the message includes an initial context setup request message.

8. The method of claim 6, wherein the assistance information further includes information on a state transition of the terminal identified based on the subscription information related to the terminal.

9. The method of claim 8, wherein at least one of the information on the mobility of the terminal or the information on the state transition is identified based on statistical information associated with the terminal.

10. The method of claim 8, wherein the information on the state transition of the terminal includes information on a time associated with an activity period for the terminal.

11. A network entity in a communication system, the network entity comprising:
a transceiver; and
a controller configured to:
identify a mobility of a terminal based on subscription information related to the terminal,
generate assistance information including information on the mobility of the terminal, and
transmit, to a base station via the transceiver, a message including the assistance information,
wherein the information on the mobility of the terminal indicates whether the terminal is to be stationary or mobile, and
wherein the assistance information is used to determine a radio resource control (RRC) connection time for the terminal.

12. The network entity of claim 11, wherein the message includes an initial context setup request message.

13. The network entity of claim 11, wherein the assistance information further includes information on a state transition of the terminal identified based on the subscription information related to the terminal.

14. The network entity of claim 13, wherein at least one of the information on the mobility of the terminal or the information on the state transition is identified based on statistical information associated with the terminal.

15. The network entity of claim 13, wherein the information on the state transition of the terminal includes information on a time associated with an activity period for the terminal.

16. A base station in a communication system, the base station comprising:
a transceiver; and
a controller coupled with the transceiver and configured to control to:
receive, from a network entity via the transceiver, a message including assistance information, the assistance information including information on a mobility of a terminal, and
identify the mobility of the terminal based on the assistance information,
wherein the information on the mobility of the terminal is identified based on subscription information related to the terminal,
wherein the information on the mobility of the terminal indicates whether the terminal is to be stationary or mobile, and
wherein the assistance information is used to determine a radio resource control (RRC) connection time for the terminal.

17. The base station of claim 16, wherein the message includes an initial context setup request message.

18. The base station of claim 16, wherein the assistance information further includes information on a state transition of the terminal identified based on the subscription information related to the terminal.

19. The base station of claim 18, wherein the information on the state transition of the terminal includes information on a time associated with an activity period for the terminal.

20. The base station of claim 16, wherein at least one of the information on the mobility of the terminal or the information on the state transition is identified based on statistical information associated with the terminal.

* * * * *